US012432514B2

(12) United States Patent
Nakai et al.

(10) Patent No.: US 12,432,514 B2
(45) Date of Patent: Sep. 30, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Akihito Nakai, Shizuoka (JP); Toru Nakagawa, Chiba (JP); Masashi Fujihara, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 248 days.

(21) Appl. No.: 18/031,598

(22) PCT Filed: Oct. 22, 2021

(86) PCT No.: PCT/JP2021/039099

§ 371 (c)(1),
(2) Date: Apr. 12, 2023

(87) PCT Pub. No.: WO2022/085786

PCT Pub. Date: Apr. 28, 2022

(65) Prior Publication Data

US 2023/0388732 A1 Nov. 30, 2023

(30) Foreign Application Priority Data

Oct. 23, 2020 (JP) ................................ 2020-178037
Oct. 8, 2021 (WO) .................. PCT/JP2021/037306

(51) Int. Cl.
*H04S 7/00* (2006.01)

(52) U.S. Cl.
CPC .......... *H04S 7/302* (2013.01); *H04S 2420/01* (2013.01)

(58) Field of Classification Search
None
See application file for complete search history.

(56) References Cited

U.S. PATENT DOCUMENTS 8,638,946 B1 * 1/2014 Mahabub ................ H04R 5/00 381/1
9,432,793 B2 * 8/2016 Fukui ...................... H04S 7/304
(Continued)

FOREIGN PATENT DOCUMENTS

JP 2009-260574 A 11/2009
JP 2013-031145 A 2/2013
JP 2020-010106 A 1/2020

OTHER PUBLICATIONS

PCT/JP2021/039099, Nov. 22, 2021, International Search Report.
(Continued)

*Primary Examiner* — Paul W Huber
(74) *Attorney, Agent, or Firm* — Wolf, Greenfield & Sacks, P.C.

(57) ABSTRACT

The present technology relates to an information processing apparatus, an information processing method, and a program capable of reproducing a sound pressure of a playback sound in a measurement environment. An information processing apparatus according to one aspect of the present technology records sound pressure reproduction data used to reproduce sound pressure of a speaker as a sound pressure when outputting a playback sound obtained by playback processing using transfer characteristics of sound in a measurement environment where the speaker is installed from an output apparatus prepared in a playback environment together with transfer characteristic data representing the transfer characteristics. The present technology can be applied to a system that performs audio mixing of contents such as movies.

8 Claims, 19 Drawing Sheets

(56) References Cited

U.S. PATENT DOCUMENTS

| | | | | |
|---|---|---|---|---|
| 10,412,523 | B2 * | 9/2019 | Mehta | H04S 7/30 |
| 10,939,225 | B2 * | 3/2021 | Riggs | H04R 3/005 |
| 11,528,577 | B2 * | 12/2022 | Cappello | G06V 40/171 |
| 11,778,403 | B2 * | 10/2023 | Joyner | H04S 7/303 381/303 |
| 12,170,879 | B2 * | 12/2024 | Lyren | H04S 7/303 |
| 2005/0213528 | A1 * | 9/2005 | Aarts | H04R 27/00 370/315 |
| 2006/0056638 | A1 * | 3/2006 | Schobben | H04S 1/002 381/17 |
| 2012/0328108 | A1 | 12/2012 | Enamito et al. | |

OTHER PUBLICATIONS

International Search Report and English translation thereof mailed Nov. 22, 2021 in connection with International Application No. PCT/JP2021/039099.

* cited by examiner

INFORMATION PROCESSING APPARATUS, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/039099, filed in the Japanese Patent Office as a Receiving Office on Oct. 22, 2021, which claims priority to International Patent Application Serial No. PCT/JP2021/037306, filed Oct. 8, 2021, which claims priority to Japanese Patent Application Number JP2020-178037, filed in the Japanese Patent Office on Oct. 23, 2020, each of which is hereby incorporated by reference in its entirety.

TECHNICAL FIELD

The present technology particularly relates to an information processing apparatus, an information processing method, and a program capable of reproducing sound pressure of playback sound in a measurement environment.

BACKGROUND ART

There is stereophonic technology that uses a head-related transfer function (HRTF) that mathematically represents the transfer characteristics of sound from a sound source to the ear.

By performing calculations using HRTF, it is possible to localize the sound image to a predetermined position and reproduce the sound heard from an output apparatus such as a headphone in three dimensions. The sound heard through the headphone is a reproduction of the sound from the sound source in the HRTF measurement environment.

CITATION LIST

Patent Literature

PTL 1
JP 2009-260574 A

SUMMARY

Technical Problem

When using HRTF, although the reproduction of the direction of the sound source can be guaranteed, the reproduction of the sound pressure cannot be guaranteed. Therefore, if you listen to the playback sound using HRTF through a headphone and produce sound for movies or music, the sound pressure of the sound heard through the headphone may differ from the sound pressure of the sound in the HRTF measurement environment.

The reason for this is that, unlike the playback sound pressure of a speaker in studios and movie theaters, there is no standard for the playback sound pressure of a headphone, and the volume setting is arbitrarily changed when used. In the sound production of movies, the playback sound pressure is defined as standards.

By ensuring that the playback sound pressure of a headphone is the same as the playback sound pressure of the measurement environment, it becomes possible to reproduce the same sound environment as the measurement environment at home and the like, which is thought to lead to the spread of production systems using HRTF.

The present technology has been made in view of such circumstances, and enables a sound pressure of a playback sound in a measurement environment to be reproduced.

Solution to Problem

An information processing apparatus according to one aspect of the present technology includes an information processing unit that records sound pressure reproduction data used to reproduce sound pressure of a speaker as a sound pressure when outputting a playback sound obtained by playback processing using HRTF from an output apparatus prepared in a playback environment together with transfer characteristic data representing transfer characteristics of sound in a measurement environment where the speaker is installed.

In one aspect of the present technology, sound pressure reproduction data used to reproduce sound pressure of a speaker as a sound pressure when outputting a playback sound obtained by playback processing using HRTF from an output apparatus prepared in a playback environment is recorded together with transfer characteristic data representing transfer characteristics of sound in a measurement environment where the speaker is installed.

DESCRIPTION OF EMBODIMENTS

An embodiment for implementing the present technique will be described below. The description will be made in the following order.

1. Configuration of sound production system
2. Overall flow of operation in sound production system
3. Operation and configuration of each apparatus
4. Modification examples <<Configuration of Sound Production System>>

Figure 1:
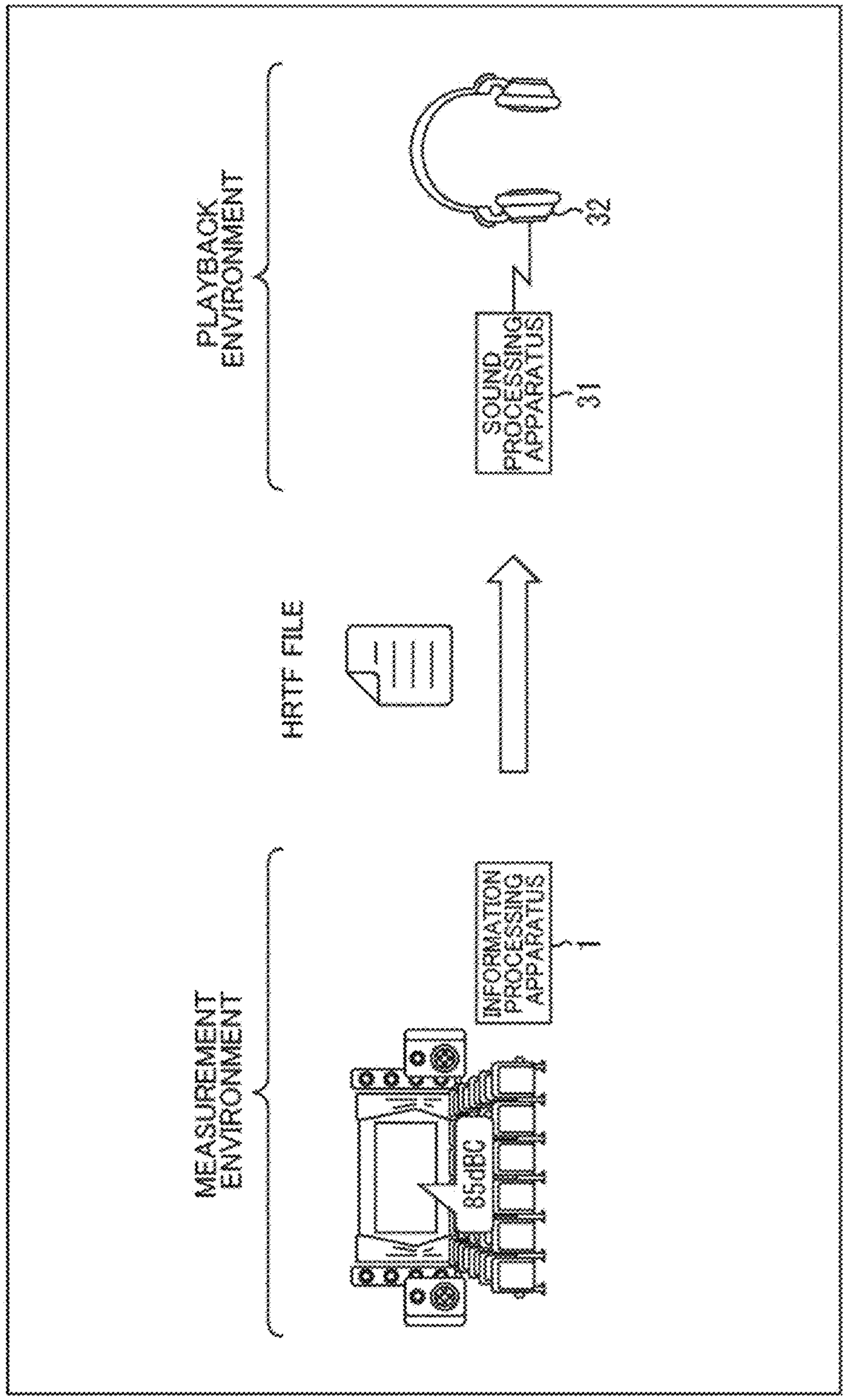
FIG. 1 is a diagram showing a configuration example of a sound production system according to an embodiment of the present technology.

FIG. 1 is a diagram showing a configuration example of a sound production system according to an embodiment of the present technology.

The sound production system in FIG. 1 is configured using an apparatus on the measurement environment side and an apparatus on the playback environment side. The sound production system of FIG. 1 is, for example, a system used for producing sound for movies.

The sound of a movie includes various sounds such as sound effects, environmental sounds, BGM, and the like, as well as sounds of characters such as actors' lines and narrations. In the following, when there is no need to distinguish between the types of sounds, the sounds will be collectively described as sound, but in reality, the sound of a movie includes sounds other than voice.

As shown on the left side of FIG. 1, the measurement environment is called a dubbing stage or the like, and is a movie theater used for sound production. A movie theater is provided with a plurality of speakers along with a screen. In addition, the movie theater is provided with an information processing apparatus 1 that acquires the measurement result of HRTF (Head-Related Transfer Function) representing the transfer characteristics of sound in the measurement environment and generates information such as an HRTF file. The information processing apparatus 1 is configured using, for example, a PC.

Generally, in a movie sound production environment, calibration is performed so that the sound pressure of playback sound output from speakers is constant so that the same experience can be obtained regardless of which movie theater the movie is viewed.

As shown in the speech balloon in FIG. 1, the playback sound pressure of movie sound is defined by standards such as SMPTE as 85 dBC. A movie sound producer performs editing and other operations while being aware that the playback sound pressure is constant at 85 dBC, which is the specified sound pressure for movie theaters.

In the measurement environment of the sound production system of FIG. 1, information used to reproduce the same sound pressure as the playback sound pressure in the measurement environment during reproduction in the playback environment is measured. An HRTF file is generated by the information processing apparatus 1 by recording data representing the measurement result together with the HRTF data.

The data representing the measurement result recorded in the HRTF file together with the HRTF data becomes sound pressure reproduction data for reproducing the same sound pressure as the sound pressure in the measurement environment during playback using the HRTF. As will be described in detail later, information representing the voltage applied to the headphone is recorded as the sound pressure reproduction data.

As indicated by the arrow in FIG. 1, the HRTF file in which the HRTF data representing the HRTF measurement result and the sound pressure reproduction data are recorded is provided to the sound processing apparatus 31 provided in the playback environment. The HRTF file may be provided to the sound processing apparatus 31 via a network such as the Internet, or may be provided using a recording medium such as a flash memory.

The playback environment is an environment in a different location than the movie theater, such as a studio or the producer's home. The playback environment may be prepared at the same location as the measurement environment.

Figure 2:
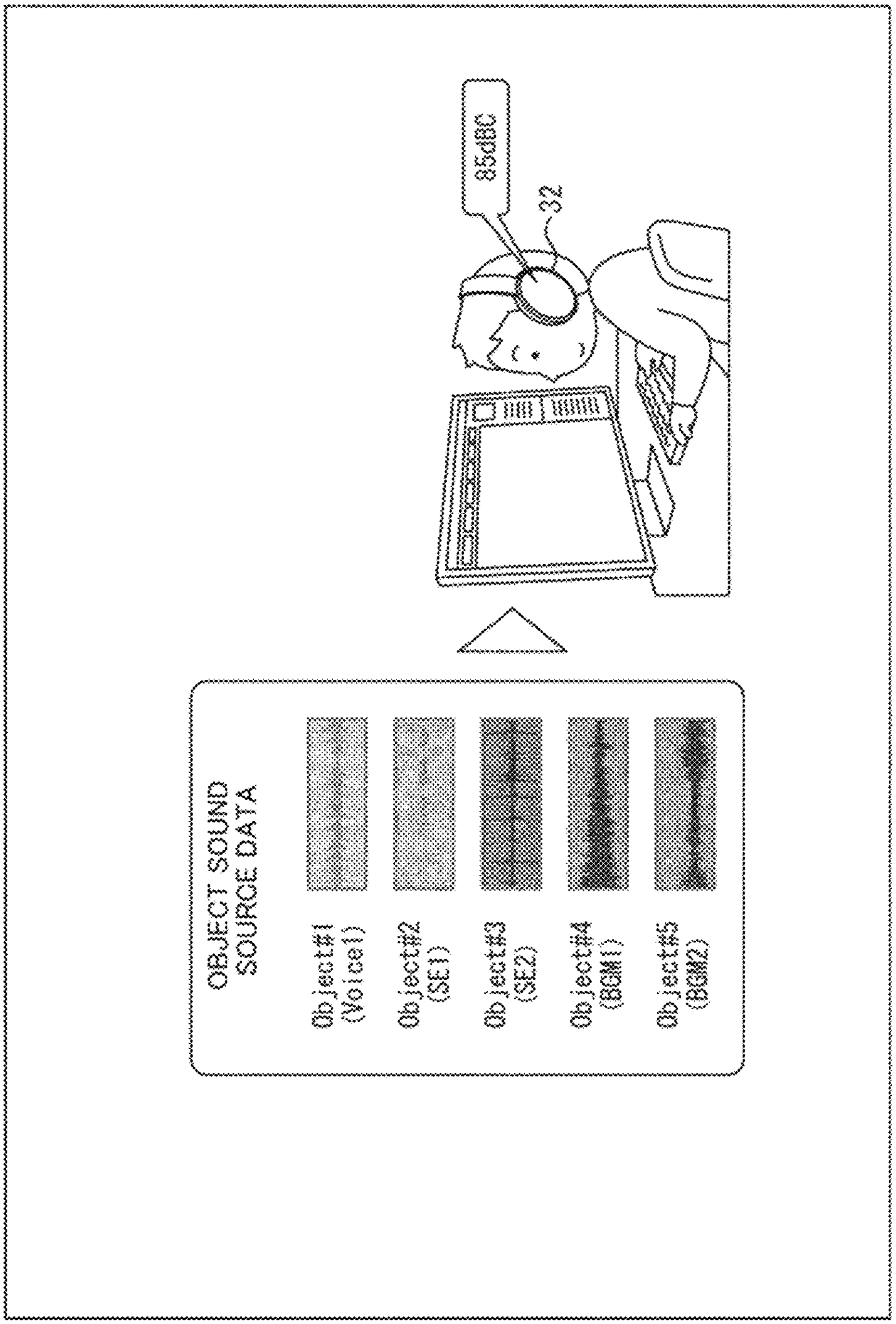
FIG. 2 is a diagram showing how playback sound pressure is reproduced.

The playback environment is provided with a sound processing apparatus 31, which is an apparatus used for editing the sound of movies. The sound processing apparatus 31 is also configured using, for example, a PC. As shown in FIG. 2, the producer uses a headphone 32 in a playback environment such as at home to edit the sound of the movie. The headphone 32 is an output apparatus prepared in the playback environment.

As shown in FIG. 2, the audio data forming the sound of a movie includes object audio data and channel audio data. The sound processing apparatus 31 plays object audio and channel audio using the HRTF data recorded in the HRTF file.

By performing playback using the HRTF data, the sound image of the sound output from the speaker in the movie theater used for the HRTF measurement is reproduced. The sound of each object heard from the headphone 32 becomes the sound heard from the direction of each sound image.

In the sound processing apparatus 31, before starting editing, sound pressure adjustment is performed using the sound pressure reproduction data recorded in the HRTF file. Object audio and channel audio are played using the settings after sound pressure adjustment.

By performing sound pressure adjustment using the sound pressure reproduction data, the sound pressure of the sound of each object heard from the headphone 32 becomes the same sound pressure as the playback sound pressure in the measurement environment. When the measurement is performed with the specified sound pressure of 85 dBC as described above, the sound pressure of the sound heard from the headphone 32 is 85 dBC as shown in the speech balloon in FIG. 2.

As described above, in the sound production system of FIG. 1, the direction of the sound source is reproduced, and the same sound pressure as the playback sound pressure at the time of measurement is reproduced. The producer can edit while hearing the sound from the same direction as the sound source in the measurement environment and with the same sound pressure as the playback sound pressure in the measurement environment.

This allows the producer to edit under the same sound environment as in a movie theater using the headphone 32. Since there is no need to go to the movie theater, the producer can edit even at home.

<<Overall Flow of Operation in Sound Production System>>

The flow of operation performed in each of the measurement environment and playback environment will be described.

<Flow of Measurement in Measurement Environment>

Figure 3:
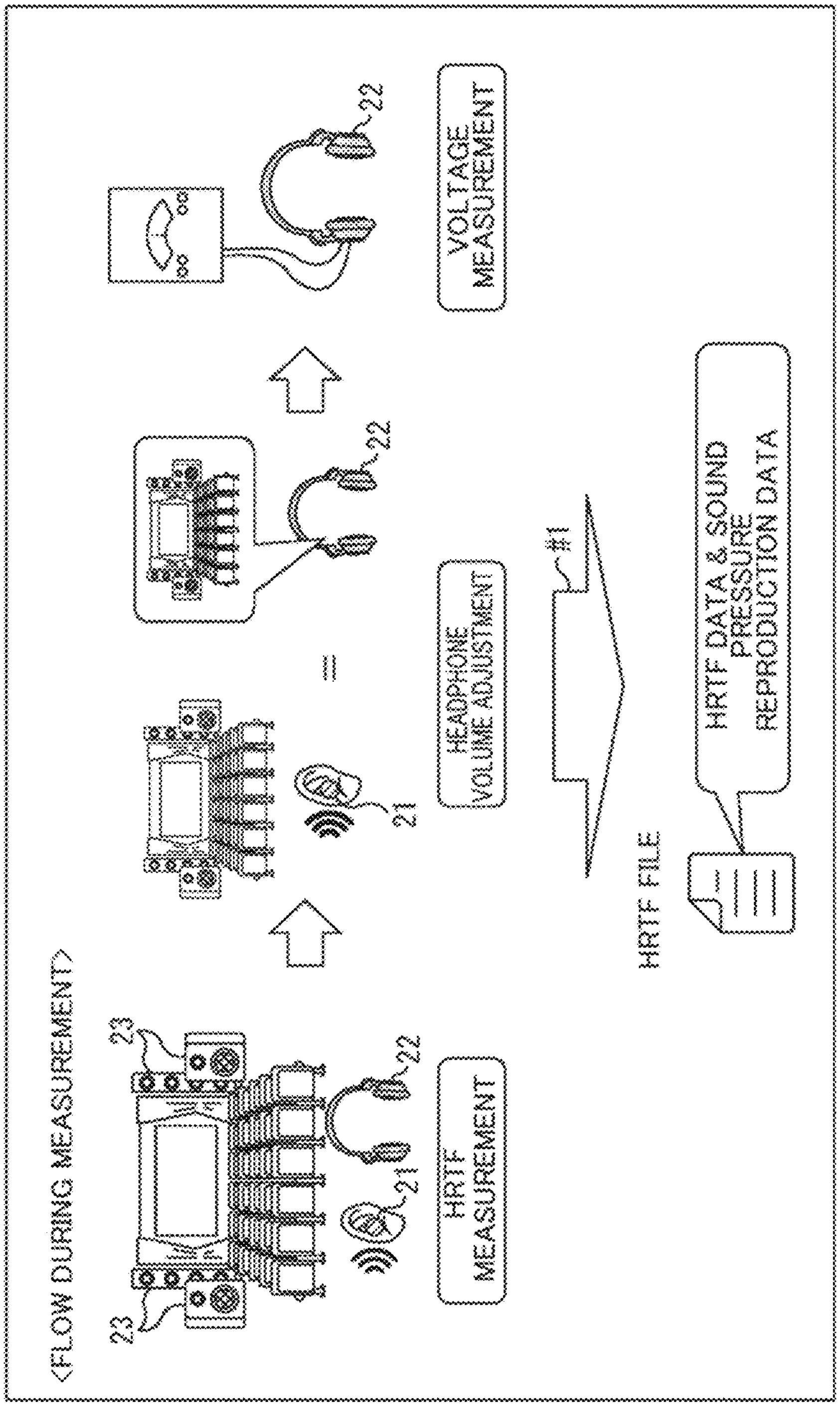
FIG. 3 is a diagram showing the flow of measurement in a measurement environment.

FIG. 3 is a diagram showing the flow of measurement in the measurement environment.

Measurements in the measurement environment mainly include HRTF measurement, headphone volume adjustment, and voltage measurement. An HRTF file is generated as indicated by arrow #1 based on the HRTF data obtained by the HRTF measurement and the sound pressure reproduction data including voltage information obtained by the voltage measurement.

HRTF Measurement

As shown on the left side of FIG. 3, the HRTF measurement is performed with, for example, a listener sitting on a predetermined seat in a movie theater with a microphone 21 attached to the earhole.

The listener may be the producer of the sound of the movie himself, or a listener different from the producer. By making the producer himself a listener, it is possible to measure the HRTF personalized to the producer. Since the HRTF differs depending on the shape of the ear and the like, it is preferable to use a personalized HRTF in order to accurately localize the sound image. It is also possible to make the HRTF measurement using a dummy head.

In this state, playback sound is output from the speaker 23 in the movie theater, and the HRTF between the speaker 23 and the earhole position (the eardrum position) is measured.

After measuring the HRTF between the speaker 23 and the earhole position, the listener puts on the headphone 22 so as to cover the ear to which the microphone 21 is attached. The headphone 22 is an output apparatus prepared in the measurement environment.

In this state, the playback sound is output from the headphone 22, and the HRTF between the headphone 22 and the earhole position is measured. As the playback sound from the headphone 22, for example, the same sound as the playback sound output from the speaker 23 is used.

The information processing apparatus 1 acquires the HRTF between the speaker 23 and the earhole position and the HRTF between the headphone 22 and the earhole position thus measured. The information processing apparatus 1 corrects the former HRTF between the speaker 23 and the earhole position based on the latter HRTF between the headphone 22 and the earhole position, and generates HRTF data representing the corrected HRTF.

A movie theater is provided with a plurality of speakers such as an L-speaker, an R-speaker, and a center speaker. As the HRTF between each speaker and the earhole position constituting the speaker 23, the HRTF corresponding to the L-speaker, the HRTF corresponding to the R-speaker, the HRTF corresponding to the center speaker, and the like are measured, and the HRTF data representing them is generated. Volume adjustment of the headphone 22 and the like, which will be described later, are also performed for each speaker that constitutes the speaker 23.

Correction of the HRTF is performed, for example, by superimposing the inverse characteristics of the HRTF between the headphone 22 and the earhole position on the HRTF between the speaker 23 and the earhole position, that is, by canceling out the HRTF between the headphone 22 and the earhole position. As a result, it is possible to obtain a highly accurate HRTF between the speaker 23 and the earhole position, taking individual differences in the headphone 22 into consideration. Since the producer of the sound of the movie becomes the listener, the HRTF that is personalized to the producer and takes the individual differences of the headphone 22 into consideration is measured.

Headphone Volume Adjustment

As shown in the center of FIG. 3, the volume of the headphone 22 is adjusted so that the sound pressure measured at the microphone 21 when the playback sound is output from the speaker 23 is the same as the sound pressure measured at the microphone 21 when the same sound is played using HRTF and the playback sound is output from the headphone 22. A playback device such as an amplifier is provided between the information processing apparatus 1 and the headphone 22.

That is, first, the sound pressure of the sound output from the speaker 23 is measured while the listener with the microphone 21 attached to his/her ear is sitting on the same seat as when the HRTF was measured. A playback sound of a specified signal such as pink noise is sequentially output from each speaker constituting the speaker 23, and the sound pressure of the playback sound output from each speaker is measured.

The specified signal is played using the HRTF corresponding to each speaker, and the playback sound is output from the headphone 22. The sound pressure of the playback sound output from the headphone 22 is measured in the microphone 21, and the volume of the headphone 22 is adjusted so that the measured sound pressure is the same as the sound pressure of the playback sound output from the speaker 23.

Voltage Measurement

As shown on the right side of FIG. 3, the voltage applied to the headphone 22 is measured when the playback sound of the specified signal is output while the volume of the headphone 22 is adjusted using the same setting as the setting after the volume adjustment.

For example, the applied voltage measured using the setting after volume adjustment based on the playback sound pressure of the L-speaker is the voltage applied to the headphone required to reproduce the same sound pressure in hearing as the playback sound pressure of the L-speaker. The applied voltage is measured using the settings after volume adjustment based on the playback sound pressure of each speaker.

Sound pressure reproduction data is generated based on the voltage information thus measured. An HRTF file is generated by recording the sound pressure reproduction data together with the HRTF data generated by the HRTF measurement.

<Flow of Sound Pressure Adjustment in Playback Environment>

Figure 4:
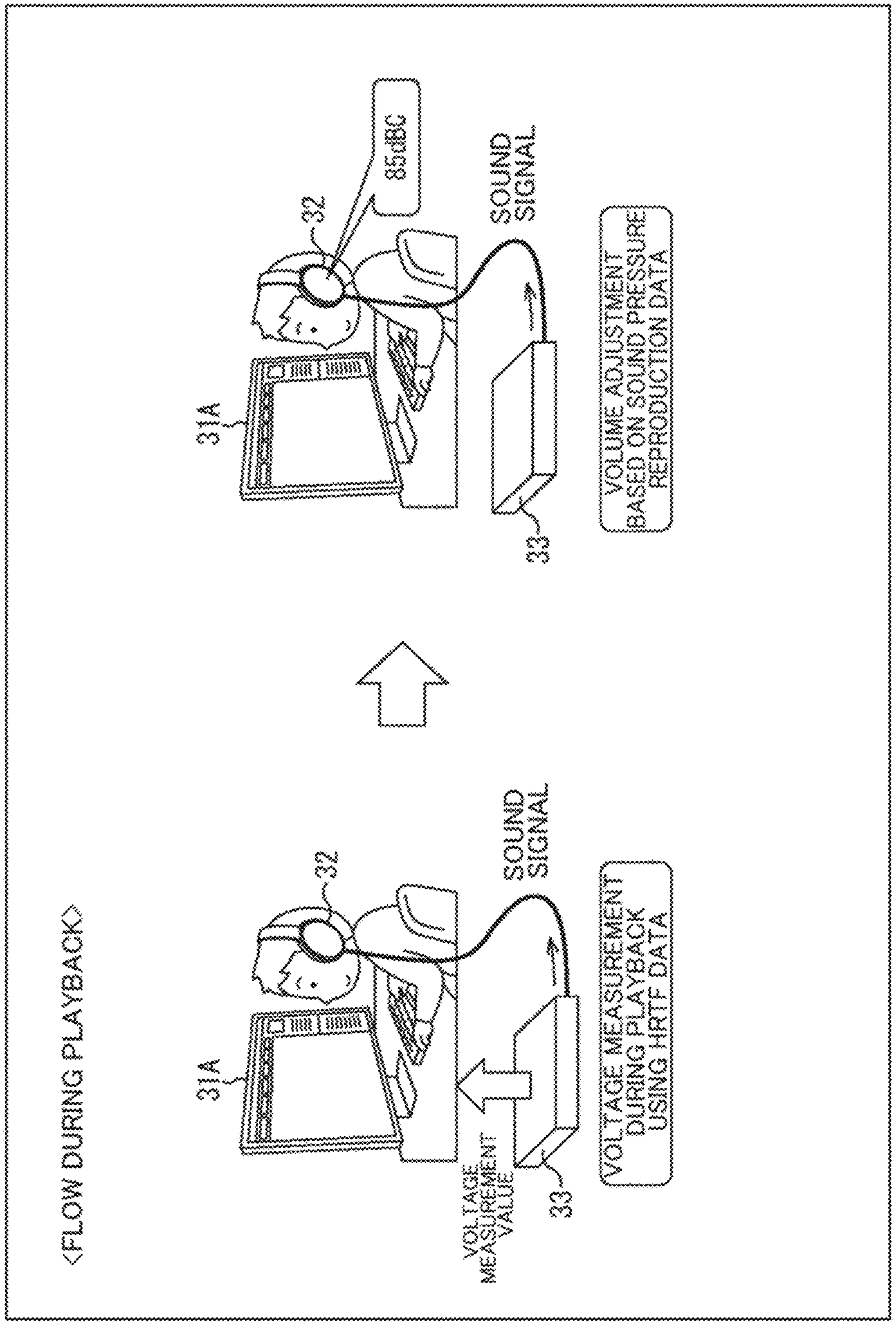
FIG. 4 is a diagram showing the flow of adjustment of playback sound pressure in a playback environment.

FIG. 4 is a diagram showing the flow of sound pressure adjustment in the playback environment.

Adjustment of playback sound pressure in the playback environment mainly includes voltage measurement during playback using HRTF data and volume adjustment based on sound pressure reproduction data.

The playback device 33 is connected to the sound processing apparatus 31 prepared in a playback environment, and the headphone 32 is connected to a headphone terminal provided in the playback device 33. The headphone 32 is, for example, a headphone of the same model number (headphone with the same specifications) manufactured by the same manufacturer as the headphone 22 used in the measurement environment. The headphone 22 brought home by the producer may be used as the headphone 32.

The producer, for example, sees the display on a display 31A connected to the sound processing apparatus 31 and operates the playback device 33 to adjust the playback sound pressure while listening to the sound output from the headphone 32. The playback device 33 is operated by operating the sound processing apparatus 31 or by operating a button or the like provided on the housing of the playback device 33.

Voltage Measurement During Playback Using HRTF Data

As shown on the left side of FIG. 4, the HRTF data included in the HRTF file is used for playback, and the playback sound is output from the headphone 32. The headphone 32 outputs a playback sound of a specified signal in which a sound image is localized at a predetermined position by playing using HRTF data.

The voltage applied to the headphone 32 that outputs the playback sound of the specified signal is measured.

The sound pressure reproduction data included in the HRTF file includes information about the specified signal used in the measurement environment when adjusting the volume of the headphone 22. A playback sound of the same signal as the specified signal used in the measurement environment is output from the headphone 32, and the applied voltage at that time is monitored.

Volume Adjustment Based on Sound Pressure Reproduction Data

When the voltage applied to the headphone 32 is measured, for example, the display 31A displays information about the sound pressure calculated based on the voltage applied to the headphone 32 and the voltage represented by the sound pressure reproduction data.

The producer looks at the display on the display 31A and adjusts the volume of the headphone 32 so that the playback sound pressure of the headphone 32 is the same as the specified sound pressure. The voltage applied to the headphone 32 changes according to the operation by the producer, and the playback sound pressure of the headphone 32 changes accordingly.

As shown in the speech balloon, by such volume adjustment, the playback sound pressure of the headphone 32 is adjusted to the specified sound pressure of 85 dBC. That is, the playback sound pressure in the measurement environment is reproduced in the playback environment.

After the playback sound pressure is adjusted as described above, the sound of the movie is edited using the same settings.

In this way, by monitoring the voltage applied to the headphone 32 and adjusting the volume during playback using HRTF data, it is possible to reproduce an environment in which the playback sound pressure is calibrated, which is required in the production of movie sounds and music.

<<Operation and Configuration of Each Apparatus>>

The operation and configuration of each of the information processing apparatus 1 provided in the measurement environment and the sound processing apparatus 31 provided in the playback environment will be described.

<Measurement Environment Side>

Operation During Measurement of Information Processing Apparatus

The measurement processing performed by the information processing apparatus 1 in the measurement environment will be described with reference to the flowchart of FIG. 5.

The measurement processing performed by the information processing apparatus 1 is the same processing as the processing described with reference to FIG. 3. Here, the processing of all the steps in FIG. 5 is described as processing performed by the information processing apparatus 1, but it is performed by other apparatuses prepared in the measurement environment as appropriate.

In step S1, the information processing apparatus 1 performs HRTF data generation processing. The HRTF data generation processing generates HRTF data that represents an HRTF that is personalized to the producer and that takes individual differences in the headphone 22 into consideration.

Figure 7:
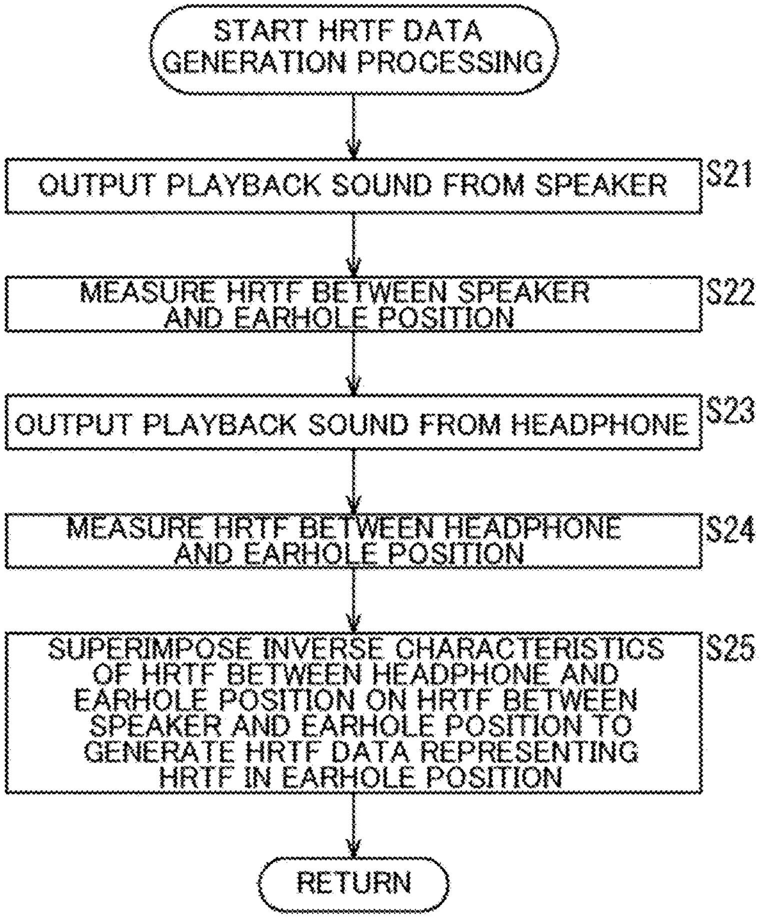
FIG. 7 is a flowchart for explaining HRTF data generation processing performed in step S1 of FIG. 5.

The HRTF data generation processing will be described later with reference to the flowchart of FIG. 7.

In step S2, the information processing apparatus 1 causes the speaker 23 to output the playback sound of the specified signal. A playback sound of a specified signal such as pink noise is sequentially output from each speaker constituting the speaker 23.

In step S3, the information processing apparatus 1 acquires the playback sound pressure of the speaker 23 measured using the microphone 21 provided at the earhole position.

In step S4, the information processing apparatus 1 plays the specified signal using the HRTF and causes the headphone 22 to output the playback sound.

In step S5, the information processing apparatus 1 acquires the playback sound pressure of the headphone 22 measured using the microphone 21 provided at the earhole position.

In step S6, the information processing apparatus 1 adjusts the volume of the headphone 22 so that the sound pressure is the same as the playback sound pressure of the speaker 23.

In step S7, the information processing apparatus 1 causes the playback sound of the specified signal to be output from the headphone 22 after the volume adjustment.

In step S8, the information processing apparatus 1 measures the voltage applied to the headphone 22 that outputs the playback sound of the specified signal.

In step S9, the information processing apparatus 1 generates sound pressure reproduction data including information on the specified signal voltage. The specified signal voltage is the measurement result of the voltage applied to the headphone 22 that outputs the playback sound of the specified signal.

In step S10, the information processing apparatus 1 generates an HRTF file in which HRTF data and sound pressure reproduction data are recorded.

Figure 6:
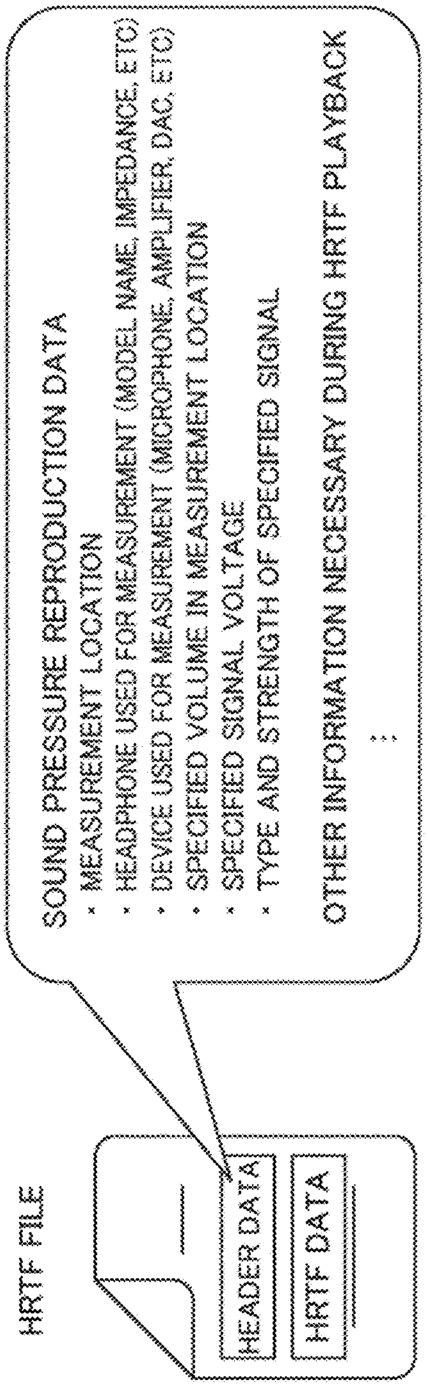
FIG. 6 is a diagram showing an example of information recorded in an HRTF file.

FIG. 6 is a diagram showing an example of information recorded in an HRTF file.

HRTF data is recorded in the HRTF file, and header data is recorded as attached information to the HRTF data. As shown in speech balloons, the header data includes sound pressure reproduction data and various types of information necessary for HRTF playback.

The sound pressure reproduction data includes information representing the measurement location, information about the headphone used for the measurement, and information about the device used for the measurement. The sound pressure reproduction data includes information representing the specified sound pressure at the measurement location, information representing the specified signal voltage, and information representing the type and strength of the specified signal.

The information representing the measurement location is information representing the location of the measurement environment. In the case of the example described above, the information on the movie theater used as the measurement environment is recorded as the information representing the measurement location. For example, a producer who edits the sound of a movie in the playback environment can identify the measurement environment based on the information representing the measurement location, and check the placement of the speakers provided in the measurement environment.

The information about the headphone used for the measurement is information about the headphone 22 used in the measurement environment. Identification information such as the manufacturer and model name of the headphone 22, and specification information such as the impedance of the headphone 22 are recorded as information related to the headphone used for the measurement. By recording information such as impedance, even if a headphone different from the headphone used in the measurement environment (a headphone with a different voltage when set to 0 dB) is used as the headphone 32 in the playback environment, it becomes possible to obtain the voltage change of the headphone 32 based on the information the impedance and the like.

The information on devices used for measurement is information on devices such as the microphone 21, an amplifier, and a DAC used in the measurement environment.

The information representing the specified sound pressure at the measurement location represents the reference sound pressure defined by standards as the sound pressure of the measurement environment. In the case of the above example, the information representing the specified sound pressure at the measurement location represents a sound pressure of 85 dBC.

The information representing the specified signal voltage represents the voltage value of the specified signal voltage described above. As described above, the measurement result of the voltage applied to the headphone 22 when outputting the sound of the specified signal using the setting after the volume adjustment is recorded as the specified signal voltage.

The information representing the type and strength of the specified signal is information representing the type and signal strength of the specified signal used in the measurement environment. In the playback environment, the playback sound pressure is adjusted using a specified signal of the same type and signal strength as the specified signal used in the measurement environment. Information such as the frequency of the specified signal may be included.

Figure 5:
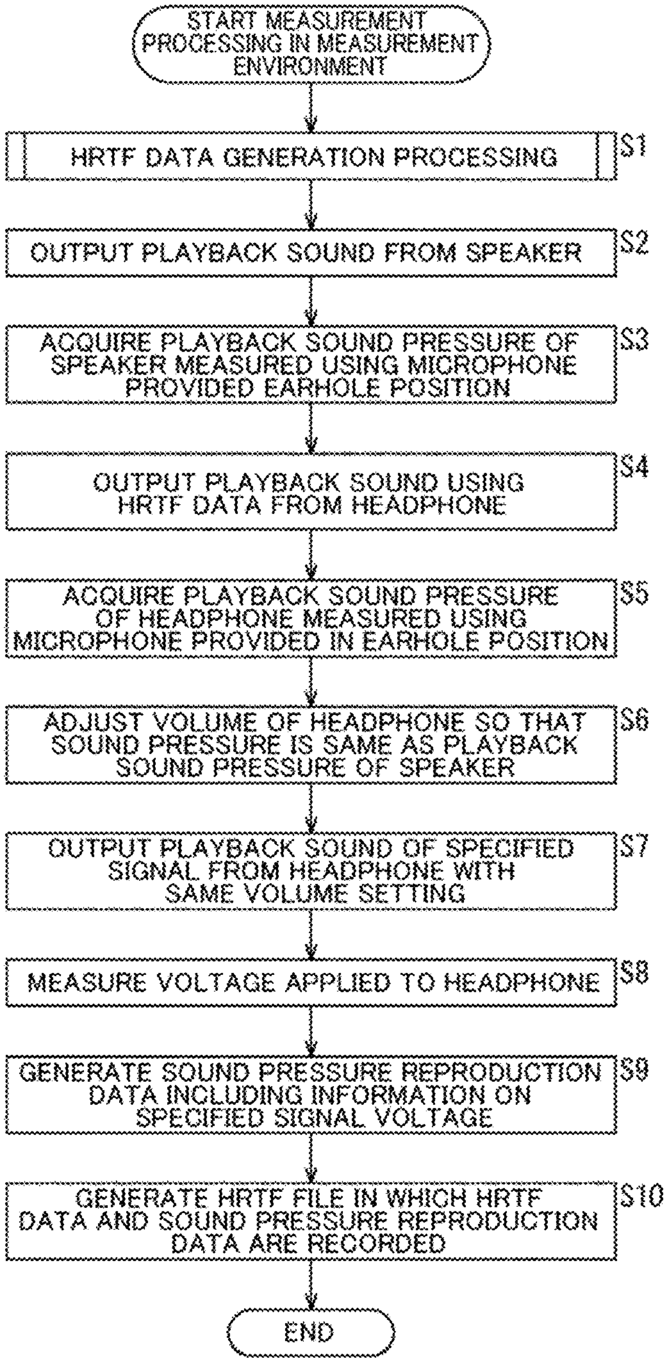
FIG. 5 is a flowchart for explaining measurement processing performed by an information processing apparatus.

After the sound pressure reproduction data including such information is recorded in the HRTF file, the processing in FIG. 5 ends.

Next, the HRTF data generation processing performed in step S1 of FIG. 5 will be described with reference to the flowchart of FIG. 7. As described above, the HRTF measurement is performed with the listener sitting on a predetermined seat in the movie theater with the microphone 21 attached to the earhole.

In step S21, the information processing apparatus 1 causes the speaker 23 in the movie theater to output a playback sound.

In step S22, the information processing apparatus 1 measures the HRTF between the speaker 23 and the earhole position based on the sound collected by the microphone 21. After measuring the HRTF between the speaker 23 and the earhole position, the listener puts on the headphone 22 so as to cover the ear to which the microphone 21 is attached.

In step S23, the information processing apparatus 1 causes the headphone 22 worn by the listener to output a playback sound.

In step S24, the information processing apparatus 1 measures the HRTF between the headphone 22 and the earhole position.

In step S25, the information processing apparatus 1 superimposes the inverse characteristics of the HRTF between the headphone 22 and the earhole position on the HRTF between the speaker 23 and the earhole position, and generates HRTF data representing the corrected HRTF between the speaker 23 and the earhole position. After that, the processing returns to step S1 in FIG. 5, and the subsequent processing is performed.

In the above description, the HRTF is measured using the microphone 21. However, the HRTF between the speaker 23 and the earhole position may be obtained based on the ear image obtained by photographing the listener's ear. In this case, an inference model for HRTF inference generated in advance by machine learning or the like is used. An inference model for HRTF inference is an inference model that takes ear images as input and HRTF as output.

A simulation may be performed based on the arrangement of the speakers 23 to obtain the HRTF.

In the above description, the playback sound pressure of the headphone 22 and the playback sound pressure of the speaker 23 are measured after measuring the HRTF, but they may be measured at the same time as the HRTF.

Configuration of Information Processing Apparatus

Figure 8:
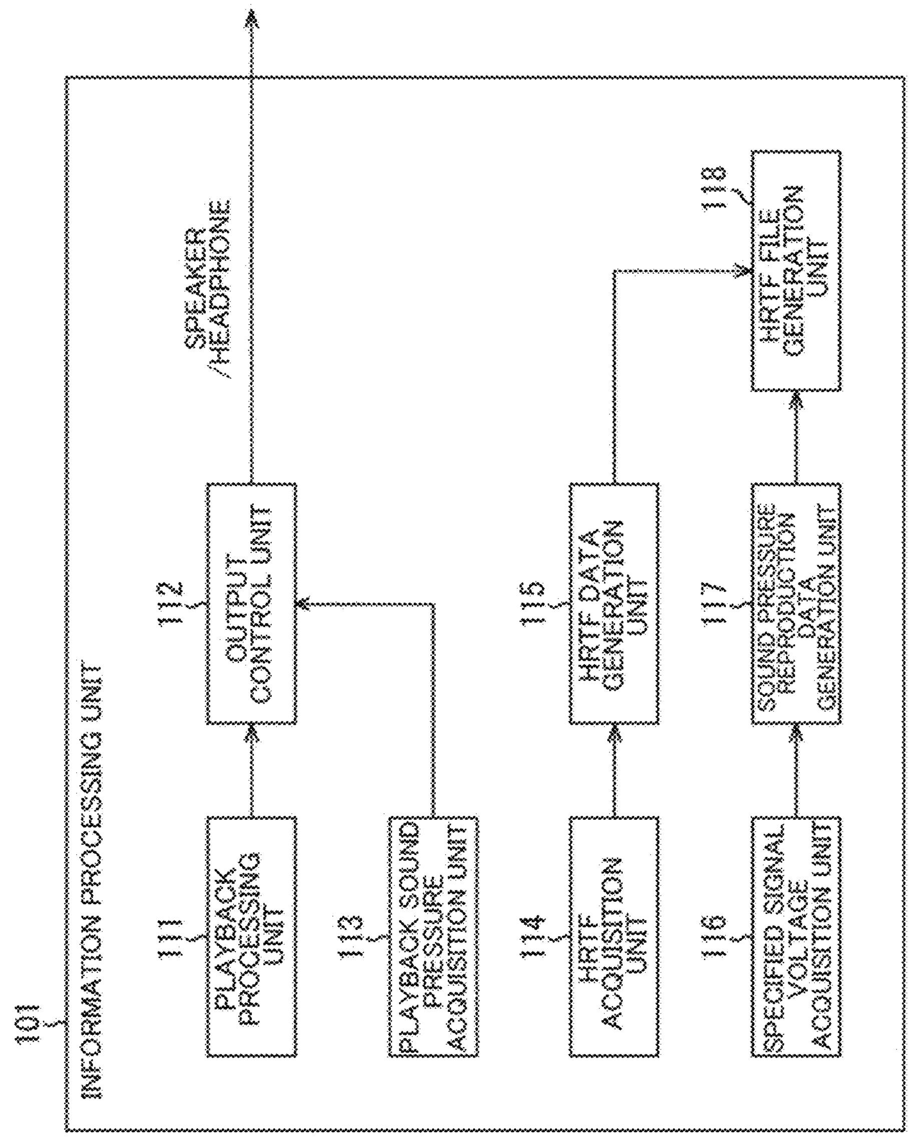
FIG. 8 is a block diagram showing a functional configuration example of the information processing apparatus.

FIG. 8 is a block diagram showing a functional configuration example of the information processing apparatus 1.

In the information processing apparatus 1, the information processing unit 101 is realized when the CPU of the PC that constitutes the information processing apparatus 1 executes a predetermined program.

The information processing unit 101 includes a playback processing unit 111, an output control unit 112, a playback sound pressure acquisition unit 113, an HRTF acquisition unit 114, an HRTF data generation unit 115, a specified signal voltage acquisition unit 116, a sound pressure reproduction data generation unit 117, and, an HRTF file generation unit 118. At least part of the configuration of the information processing unit 101 may be implemented by another apparatus such as an amplifier provided in the measurement environment.

The playback processing unit 111 controls playback of sound output from the headphone 22 and the speaker 23. A signal obtained by playing audio data such as the data of the specified signal is supplied to the output control unit 112.

The output control unit 112 causes the headphone 22 and the speaker 23 to output playback sound based on the signal supplied from the playback processing unit 111.

The output control unit 112 also adjusts the volume of the headphone 22 based on the playback sound pressure of the headphone 22 acquired by the playback sound pressure acquisition unit 113. The volume adjustment of the headphone 22 may be automatically performed by the information processing apparatus 1, or may be manually performed by the measurer.

The processing of steps S2, S4, S6, and S7 in FIG. 5 is performed by the playback processing unit 111 and the output control unit 112. The processing of steps S21 and S23 in FIG. 7 is performed by the playback processing unit 111 and the output control unit 112.

The playback sound pressure acquisition unit 113 acquires the playback sound pressure of the headphone 22 and the playback sound pressure of the speaker 23 based on the strength of the signal representing the sound collected by the microphone 21. The information representing the playback sound pressure acquired by the playback sound pressure acquisition unit 113 is supplied to the output control unit 112 and used for adjusting the volume of the headphone 22. The processing of steps S3 and S5 in FIG. 5 is performed by the playback sound pressure acquisition unit 113.

The HRTF acquisition unit 114 acquires the HRTF between the headphone 22 and the earhole position and the HRTF between the speaker 23 and the earhole position based on the sound collected by the microphone 21. The information representing the HRTF acquired by the HRTF acquisition unit 114 is supplied to the HRTF data generation unit 115. The processing of steps S22 and S24 in FIG. 7 is performed by the HRTF acquisition unit 114.

The HRTF data generation unit 115 corrects the HRTF between the speaker 23 and the earhole position based on the HRTF acquired by the HRTF acquisition unit 114, and generates HRTF data representing the corrected HRTF. The HRTF data generated by the HRTF data generation unit 115 is supplied to the HRTF file generation unit 118. The processing of step S25 in FIG. 7 is performed by the HRTF data generation unit 115.

The specified signal voltage acquisition unit 116 acquires the measurement result of the voltage applied to the headphone 22 after the volume adjustment. The information representing the measurement result acquired by the specified signal voltage acquisition unit 116 is supplied to the sound pressure reproduction data generation unit 117. The processing of step S8 in FIG. 5 is performed by the specified signal voltage acquisition unit 116.

The sound pressure reproduction data generation unit 117 generates sound pressure reproduction data including the information described with reference to FIG. 6. based on the information and the like supplied from the specified signal voltage acquisition unit 116. The sound pressure reproduction data generated by the sound pressure reproduction data generation unit 117 is supplied to the HRTF file generation unit 118. The processing of step S9 in FIG. 5 is performed by the sound pressure reproduction data generation unit 117.

The HRTF file generation unit 118 generates an HRTF file by adding header data including the sound pressure reproduction data supplied from the sound pressure reproduction data generation unit 117 to the HRTF data supplied from the HRTF data generation unit 115. The processing of step S10 in FIG. 5 is performed by the HRTF file generation unit 118.

<Playback Environment Side>

Operation of Sound Processing Apparatus During Playback

Sound pressure reproduction processing performed by the sound processing apparatus 31 in the playback environment will be described with reference to the flowchart of FIG. 9.

The sound pressure reproduction processing performed by the sound processing apparatus 31 is the same processing as the processing described with reference to FIG. 4. Here, the processing of all the steps in FIG. 9 is described as processing performed by the sound processing apparatus 31, but it is performed by other apparatuses prepared in the playback environment as appropriate.

For example, the producer checks the manufacturer and model number of the headphone 22 used in the measurement environment based on the sound pressure reproduction data, prepares the headphone 32 with the same specifications, and adjusts the sound pressure before editing.

In step S51, the sound processing apparatus 31 acquires sound pressure reproduction data from the header data of the HRTF file.

In step S52, the sound processing apparatus 31 acquires HRTF data from the HRTF file.

In step S53, the sound processing apparatus 31 identifies the specified signal used in the measurement environment based on the sound pressure reproduction data, and performs playback processing on the same specified signal as the identified specified signal. For example, the playback processing is performed using a specified signal of the same type and signal strength as the specified signal used in the measurement environment.

The sound processing apparatus 31 performs binaural processing using the HRTF data to generate a playback signal of the specified signal. Based on the signals obtained by the binaural processing, 2-channel mix processing is performed as appropriate, and the L-ch playback signal and the R-ch playback signal are supplied to the headphone 32.

In step S54, the sound processing apparatus 31 causes the headphone 32 to output the playback sound of the specified signal. The headphone 32 outputs the playback sound of the specified signal in which the sound image is localized at a predetermined position by playing using the HRTF data.

In step S55, the sound processing apparatus 31 acquires the measurement result of the voltage applied to the headphone 32.

In step S56, the sound processing apparatus 31 identifies the specified signal voltage based on the sound pressure reproduction data, and calculates the playback sound pressure of the headphone 32 based on the specified signal voltage and the voltage applied to the headphone 32.

When the specified sound pressure is 85 dBC, the playback sound pressure of the headphone 32 is calculated by Equation (1) below.

[Math. 1]

$$\text{Gain away from 85 dBC[dB]}{=}{=}20*\log(\text{Measured Voltage[Vrms]}/\text{Required voltage[Vrms]}) \quad (1)$$

In step S57, the sound processing apparatus 31 displays information about the playback sound pressure of the headphone 32 on the display 31A, and notifies the producer.

Figure 10:
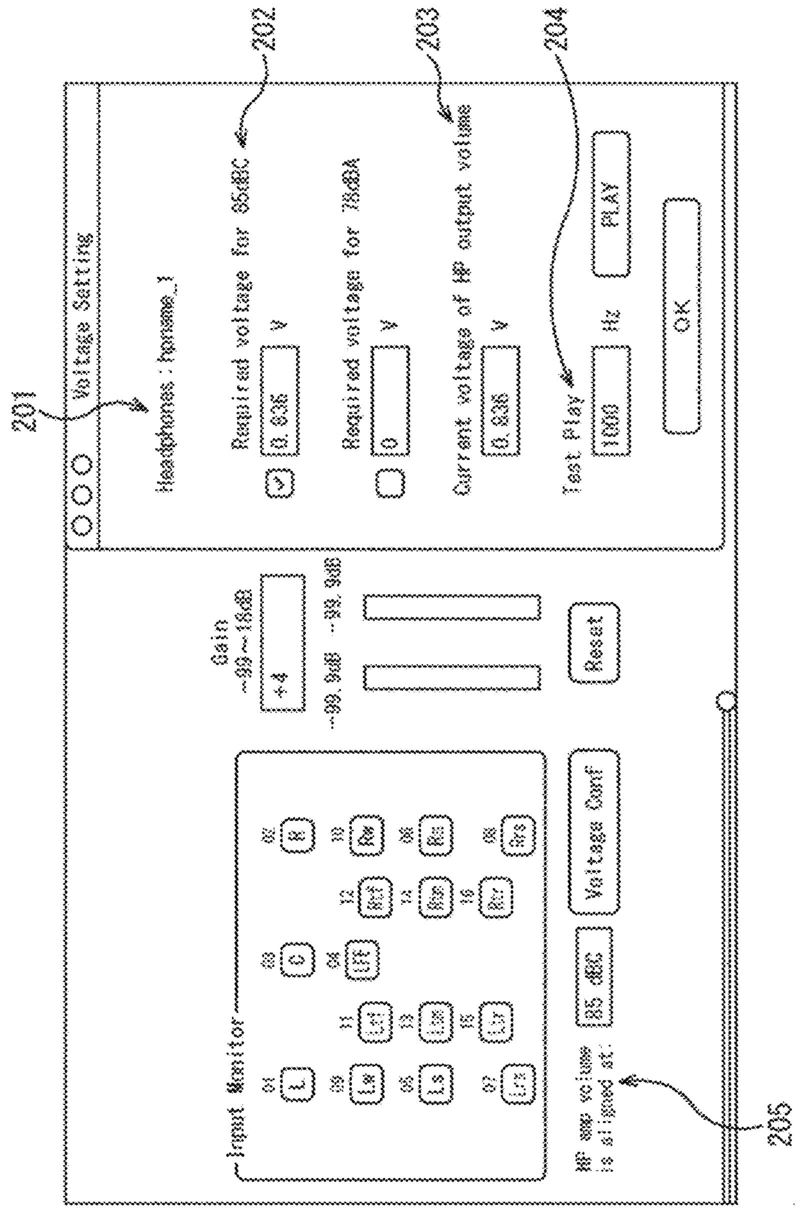
FIG. 10 is a diagram showing display examples of information on playback sound pressure.

FIG. 10 is a diagram showing a display example of information about the playback sound pressure.

The screen shown in FIG. 10 is a screen displayed by an application installed in the sound processing apparatus 31. The application installed in the sound processing apparatus 31 reads the HRTF file and displays the screen shown in FIG. 10.

The information about the voltage applied to the headphone 32 is displayed on the right side of the screen. An item 201 with the name "Headphones" is a display related to headphone in use. In the example of FIG. 10, "hpname_1" is displayed as the name of the headphone 32.

An item 202 with the name "Required voltage for 85 dBC" is a display related to the voltage required to reproduce the specified sound pressure of 85 dBC. In the example of FIG. 10, "0.836" V is displayed as the required voltage. The value of "0.836" V is displayed based on the specified signal voltage included in the sound pressure reproduction data.

An item 203 with the name "Current voltage of HP output volume" is a display of the current voltage applied to the headphone 32. In the example of FIG. 10, "0.836" V is displayed as the current voltage applied to the headphone 32. A value of "0.836" V is displayed based on the measurement result of the voltage applied to the headphone 32.

An item 204 with the name "Test Play" is a display related to a function for outputting the playback sound of the specified signal from the headphone 32. In the example of FIG. 10, it is displayed that the signal of "1000" Hz is played as the specified signal.

The "Test Play" function is used during voltage measurement. When the PLAY button is pressed, the processing of steps S53 and S54 in FIG. 9 is performed and the playback sound of the specified signal is output from the headphone 32. The information about the frequency of the specified signal is displayed based on the type of the specified signal specified by the sound pressure reproduction data.

An item 205 with the name "HP amp volume is aligned at:" is a display related to the playback sound pressure of the headphone 32. In the example of FIG. 10, "85 dBC" is displayed as the playback sound pressure of the headphone 32. The playback sound pressure of "85 dBC" is the playback sound pressure calculated in step S56.

The display shown in FIG. 10 is a display when the voltage applied to the headphone 32 is the same voltage as the specified signal voltage, and the playback sound of 85 dBC, which is the specified sound pressure, is output from the headphone 32. For example, when the voltage applied to the headphone 32 is different from the specified signal voltage, a numerical value representing the sound pressure different from the specified sound pressure is displayed in the column of the item 205.

The producer can see the display of the item 205 to check how much the playback sound pressure of the headphone 32 deviates from the specified sound pressure. The producer adjusts the volume of the headphone 32 while checking the playback sound pressure of the headphone 32 displayed in the item 205.

In addition, the producer checks the voltage applied to the headphone 32 displayed as the item 203, and adjusts the volume of the headphone 32 so that the voltage applied to the headphone 32 is the same as the specified signal voltage displayed as item 202. Voltage-based volume adjustment is performed, for example, when the specifications such as impedance of the headphone 32 are the same as the specifications of the headphone 22 used in the measurement environment.

The sound processing apparatus 31 may automatically adjust the volume of the headphone 32 so that the playback sound pressure of the headphone 32 is the same as the specified sound pressure.

Figure 9:
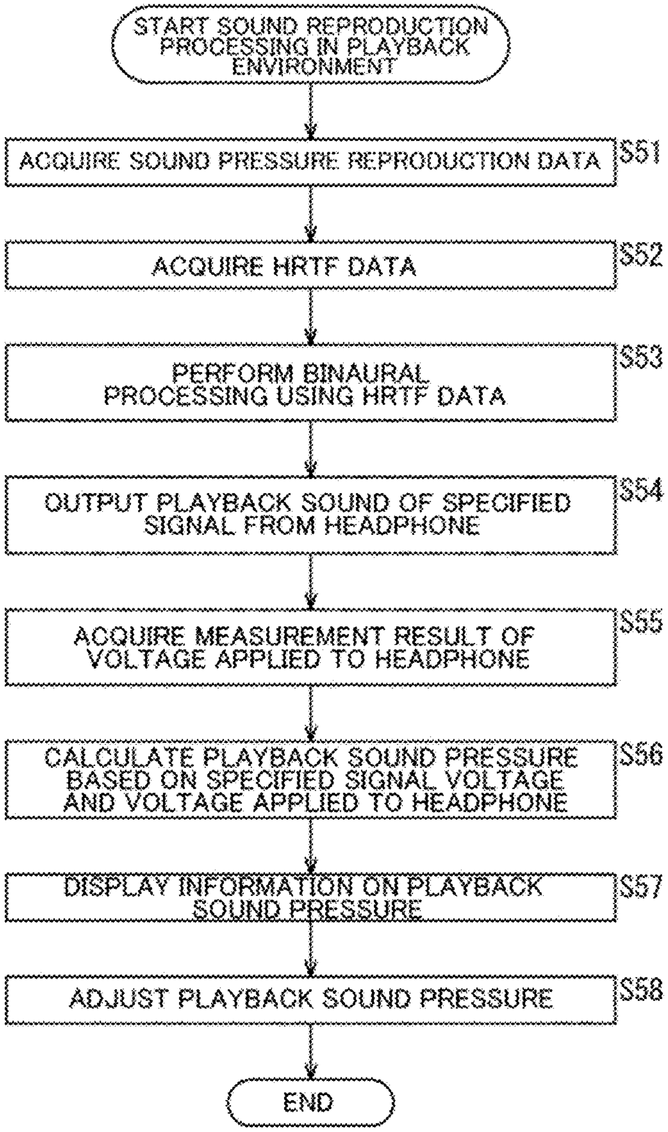
FIG. 9 is a flowchart for explaining sound pressure reproduction processing performed by a sound processing apparatus.

Returning to the description of FIG. 9, in step S58, the sound processing apparatus 31 adjusts the volume of the headphone 32 to adjust the playback sound pressure. When the playback sound pressure of the headphone 32 reaches 85 dBC, which is the same as the specified sound pressure, the sound pressure reproduction processing ends.

Configuration of Sound Processing Apparatus

Figure 11:
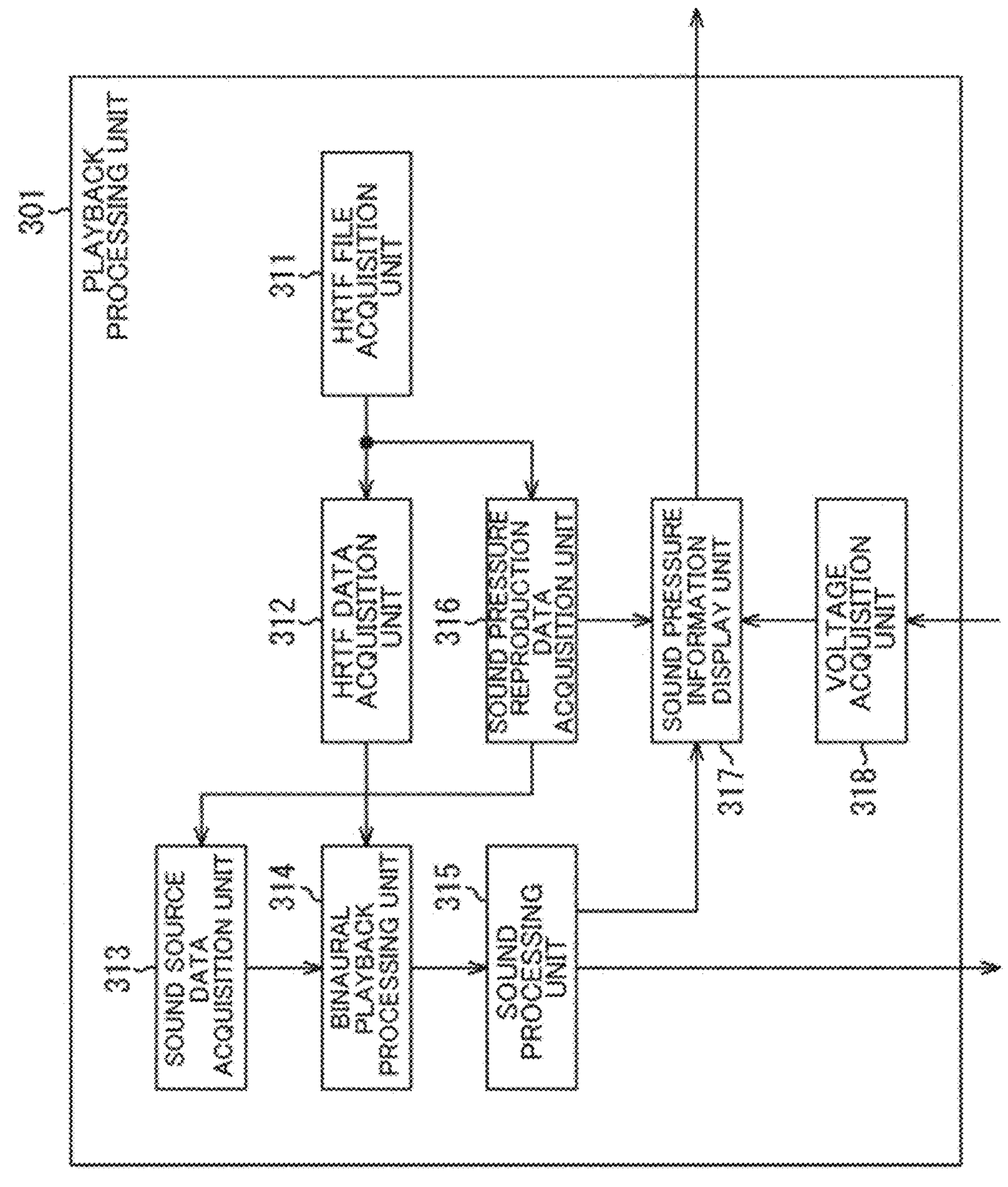
FIG. 11 is a block diagram showing an example of the functional configuration of the sound processing apparatus.

FIG. 11 is a block diagram showing a functional configuration example of the sound processing apparatus 31.

In the sound processing apparatus 31, the playback processing unit 301 is realized when the CPU of the PC that constitutes the sound processing apparatus 31 executes a predetermined program.

The playback processing unit 301 includes an HRTF file acquisition unit 311, an HRTF data acquisition unit 312, a sound source data acquisition unit 313, a binaural playback processing unit 314, a sound processing unit 315, a sound pressure reproduction data acquisition unit 316, a sound pressure information display unit 317, and a voltage acquisition unit 318. At least part of the configuration of the playback processing unit 301 may be implemented in another apparatus provided in the playback environment.

The HRTF file acquisition unit 311 acquires the HRTF file provided from the information processing apparatus 1. The HRTF file acquired by the HRTF file acquisition unit 311 is supplied to the HRTF data acquisition unit 312 and the sound pressure reproduction data acquisition unit 316.

The HRTF data acquisition unit 312 acquires HRTF data from an HRTF file. The HRTF data acquired by the HRTF data acquisition unit 312 is supplied to the binaural playback processing unit 314. The processing of step S52 in FIG. 9 is performed by the HRTF data acquisition unit 312.

The sound source data acquisition unit 313 acquires sound source data used when adjusting the playback sound pressure. For example, based on the sound pressure reproduction data supplied from the sound pressure reproduction data acquisition unit 316, the type of the specified signal used in the measurement environment is specified, and the sound source data of the same signal as the specified signal is acquired. The sound source data acquired by the binaural playback processing unit 314 is supplied to the binaural playback processing unit 314.

The binaural playback processing unit 314 uses the HRTF data supplied from the HRTF data acquisition unit 312 to perform binaural processing on the sound source data supplied from the sound source data acquisition unit 313, thereby generating a playback signal of the specified signal. The playback signal of the specified signal generated by the binaural playback processing unit 314 is supplied to the sound processing unit 315. The processing of step S53 in FIG. 9 is performed by the binaural playback processing unit 314.

The sound processing unit 315 performs sound processing such as 2-channel mix processing, sound quality adjustment (EQ), and gain adjustment on the playback signal supplied from the binaural playback processing unit 314, and outputs the playback signal obtained by performing the sound processing. For example, the L-ch playback signal and the R-ch playback signal output from the sound processing unit 315 are supplied to the headphone 32 via the playback device 33 connected to the sound processing apparatus 31. A playback sound corresponding to the playback signal is output from the headphone 32. The processing of step S54 in FIG. 9 is performed by the sound processing unit 315.

For example, when gain adjustment is performed according to an operation of the producer, the sound processing unit 315 outputs information about the content of the gain adjustment to the sound pressure information display unit 317. The content of the gain adjustment is appropriately reflected in the information presented to the producer.

The sound pressure reproduction data acquisition unit 316 acquires sound pressure reproduction data from the header data of the HRTF file. The sound pressure reproduction data acquired by the sound pressure reproduction data acquisition unit 316 is supplied to the sound source data acquisition unit 313 and the sound pressure information display unit 317. The processing of step S51 in FIG. 9 is performed by the sound pressure reproduction data acquisition unit 316.

The sound pressure information display unit 317 displays such a screen as described with reference to FIG. 10 on the display 31A based on the sound pressure reproduction data supplied from the sound pressure reproduction data acquisition unit 316 and the measurement result of the voltage applied to the headphone 32 supplied from the voltage acquisition unit 318.

That is, the sound pressure information display unit 317 calculates the playback sound pressure of the headphone 32 based on the sound pressure reproduction data and the measurement result of the voltage applied to the headphone 32, and displays information such as the calculated playback sound pressure on the display 31A. The sound pressure information display unit 317 functions as a display processing unit that displays information about the playback sound pressure of the headphone 32. The processing of steps S56 and S57 in FIG. 9 is performed by the sound pressure information display unit 317.

The voltage acquisition unit 318 acquires the measurement result of the voltage applied to the headphone 32. The information representing the measurement result acquired by the voltage acquisition unit 318 is supplied to the sound pressure information display unit 317. The processing of step S55 in FIG. 9 is performed by the voltage acquisition unit 318.

<Example of Voltage Measurement>

A specific example of measuring the voltage applied to the headphone 32 will be described.

First Example

Figure 12:
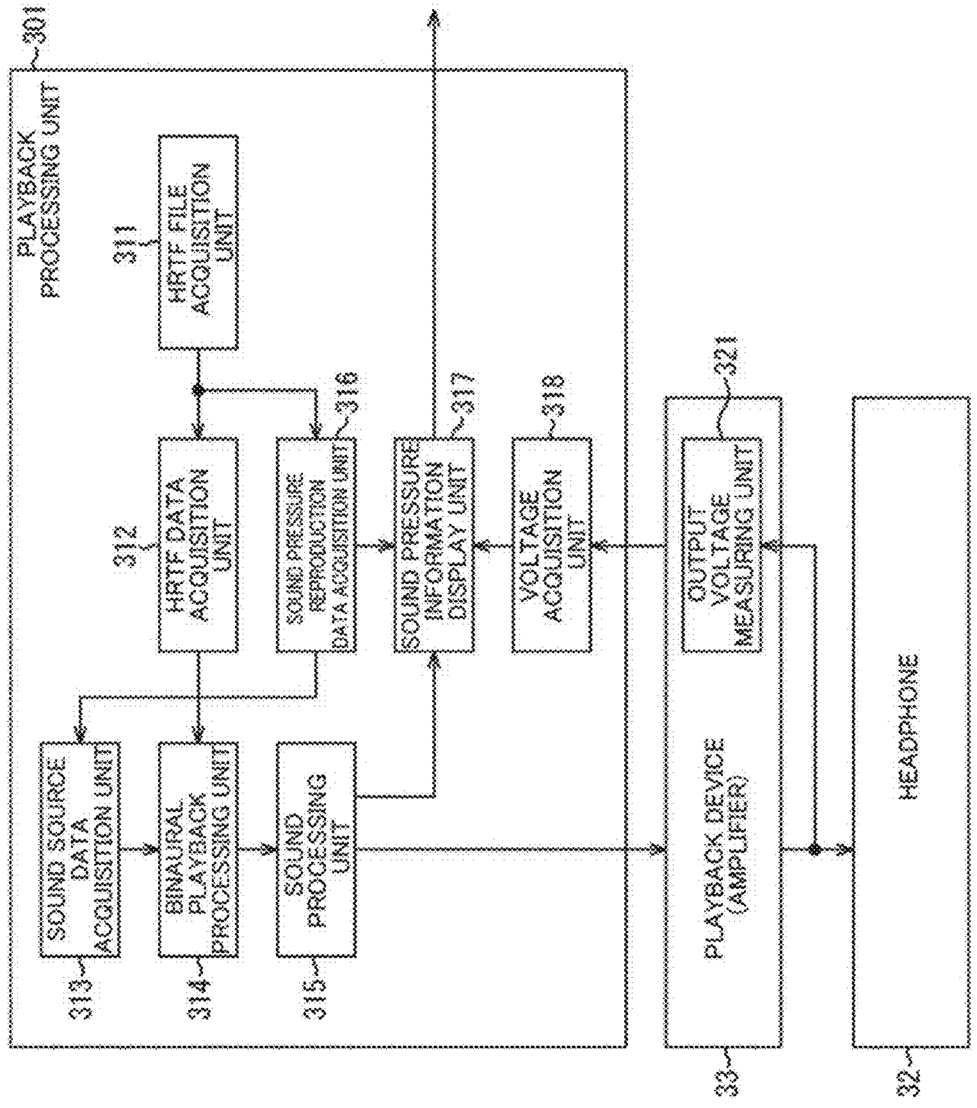
FIG. 12 is a block diagram showing a configuration example related to voltage measurement.

FIG. 12 is a block diagram showing a configuration example related to voltage measurement. Among the components shown in FIG. 12, the same components as those described with reference to FIG. 11. Redundant description will be appropriately omitted. The same applies to other examples described below.

The configuration shown in FIG. 12 is a configuration in which HRTF data and sound pressure reproduction data are acquired on the side of the sound processing apparatus 31, which is a PC. The playback processing unit 301 of the sound processing apparatus 31 has the same configuration as the configuration described with reference to FIG. 11.

The playback device 33 that is an amplifier is connected to the sound processing apparatus 31, and a cable on the headphone 32 side is connected to a headphone terminal provided in the playback device 33. A playback signal output from the sound processing unit 315 is supplied to the headphone 32 via the playback device 33.

The playback device 33 is provided with an output voltage measuring unit 321. The output voltage measuring unit 321 measures the output voltage to the headphone 32 and outputs information representing the measurement result to the sound processing apparatus 31. The information output from the output voltage measuring unit 321 is acquired by the voltage acquisition unit 318 of the playback processing unit 301.

In this way, the playback device 33 can measure the voltage applied to the headphone 32. By using the playback device 33, it is possible to measure the voltage taking the voltage division effect when the cable of the headphone 32 is inserted into consideration.

Second Example

Figure 13:
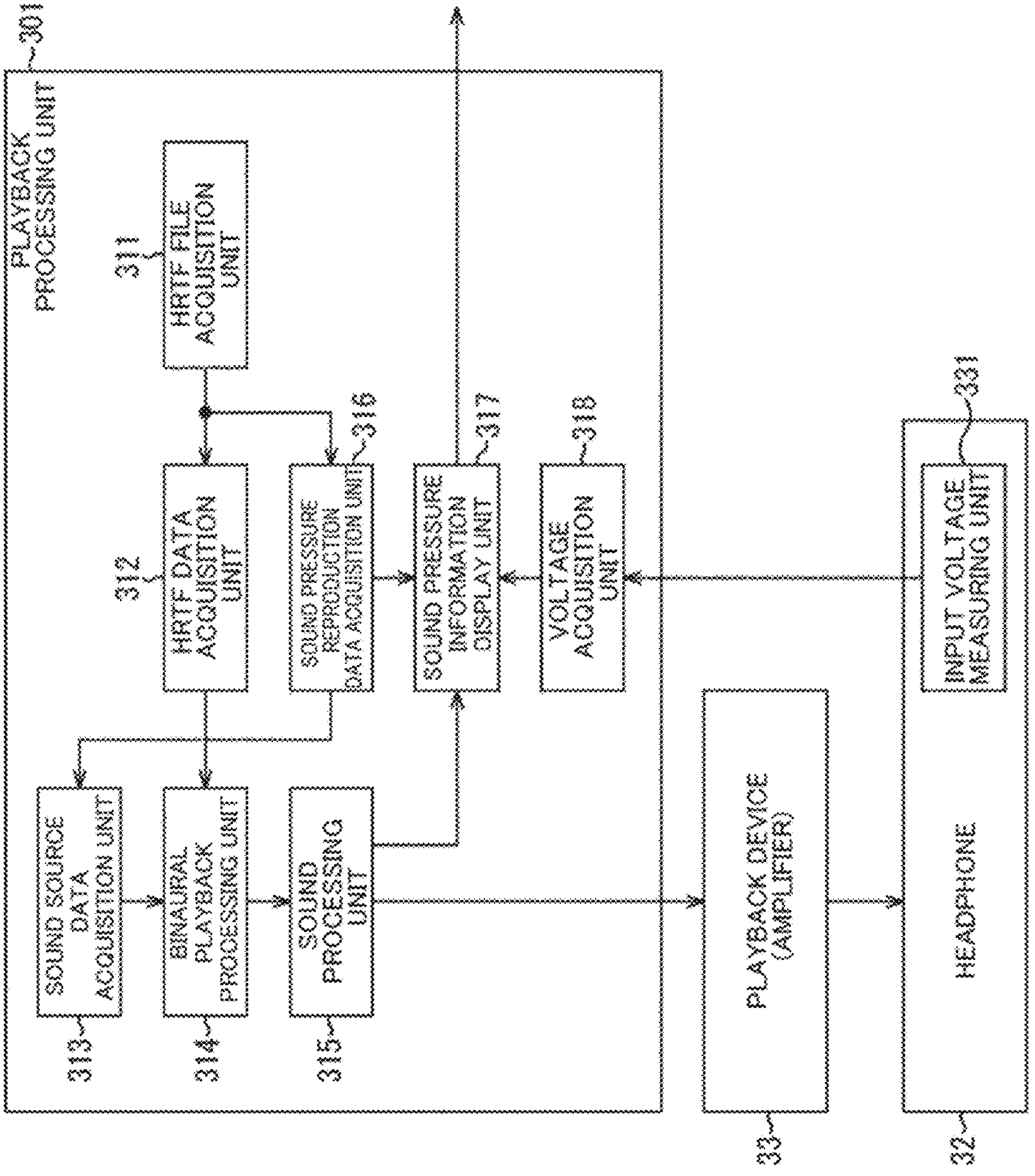
FIG. 13 is a block diagram showing another configuration example related to voltage measurement.

FIG. 13 is a block diagram showing another configuration example related to voltage measurement.

The configuration shown in FIG. 13 is a configuration in which HRTF data and sound pressure reproduction data are acquired on the sound processing apparatus 31 side, and the voltage applied to the headphone 32 is measured on the headphone 32 side.

The headphone 32 is provided with an input voltage measuring unit 331. The input voltage measuring unit 331 measures the input voltage to the headphone 32 and outputs information representing the measurement result to the sound processing apparatus 31. The information output from the input voltage measuring unit 331 is acquired by the voltage acquisition unit 318 of the playback processing unit 301.

In this way, it is possible for the headphone 32 to measure the voltage applied to the headphone 32.

For example, the headphone 32 is powered by the playback device 33. If the headphone 32 is a battery-powered active headphone, the voltage can be measured without external power supply. If the headphone 32 is a wireless headphone, the playback device 33 may not be provided.

Third Example

Figure 14:
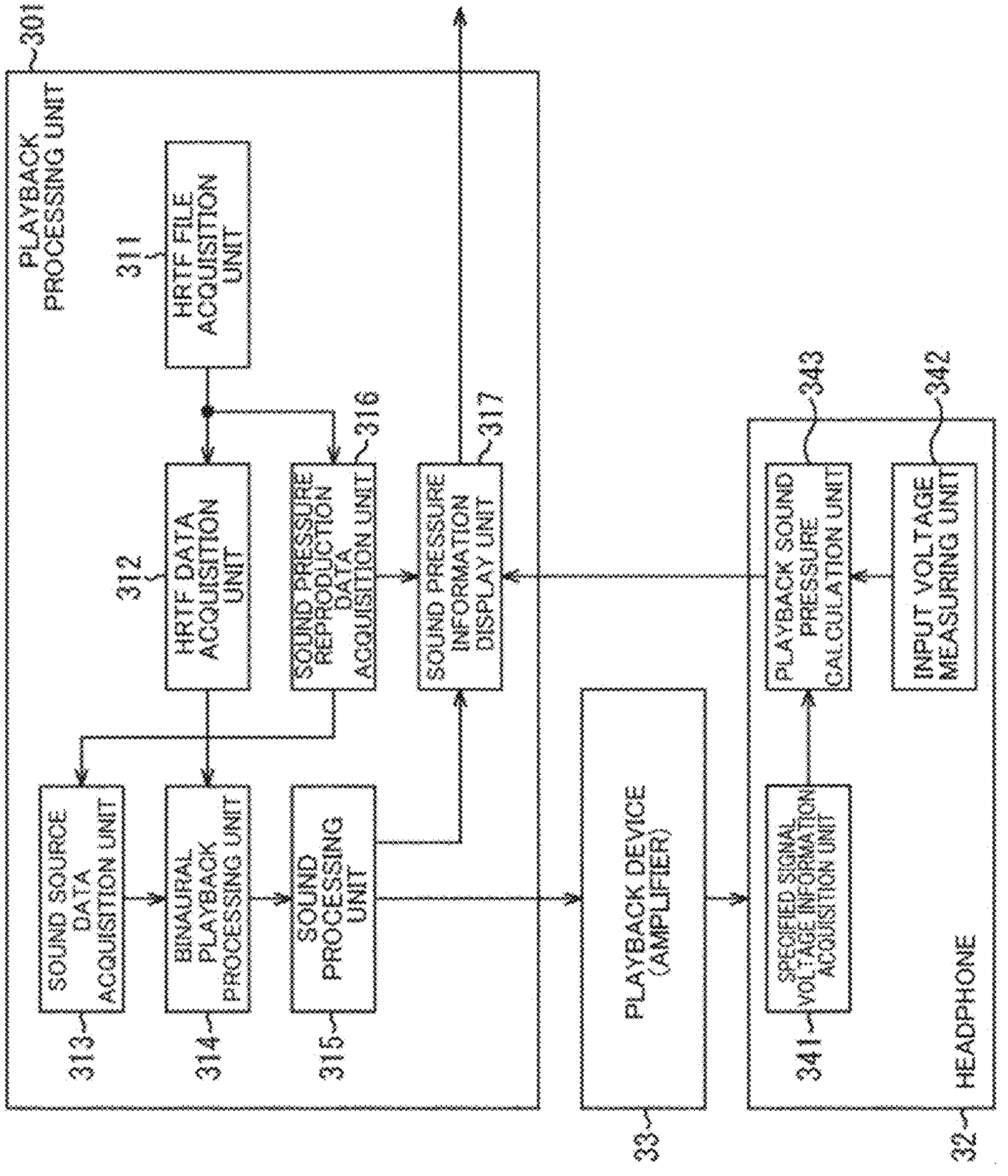
FIG. 14 is a block diagram showing another configuration example related to voltage measurement.

FIG. 14 is a block diagram showing another configuration example related to voltage measurement.

The configuration shown in FIG. 14 is a configuration in which HRTF data and sound pressure reproduction data are acquired on the sound processing apparatus 31 side, and the voltage applied to the headphone 32 is measured on the headphone 32 side. In the example of FIG. 14, the headphone 32 calculates the playback sound pressure.

The headphone 32 is provided with a specified signal voltage information acquisition unit 341, an input voltage measuring unit 342, and a playback sound pressure calculation unit 343.

The specified signal voltage information acquisition unit 341 acquires information on the specified signal voltage included in the sound pressure reproduction data. For example, the sound pressure reproduction data acquired by the sound pressure reproduction data acquisition unit 316 is transmitted from the sound processing apparatus 31 to the headphone 32 and received by the specified signal voltage information acquisition unit 341. The information on the specified signal voltage acquired by the specified signal voltage information acquisition unit 341 is supplied to the playback sound pressure calculation unit 343.

The information on the specified signal voltage may be set for the headphone 32 by the manufacturer. In this case, the specified signal voltage information acquisition unit 341 acquires information on the specified signal voltage set by the producer.

The input voltage measuring unit 342 measures the input voltage to the headphone 32 and outputs information representing the measurement result to the playback sound pressure calculation unit 343.

The playback sound pressure calculation unit 343 calculates the playback sound pressure of the headphone 32 based on the specified signal voltage acquired by the specified signal voltage information acquisition unit 341 and the input voltage measured by the input voltage measuring unit 342, and outputs the information representing the playback sound pressure to the sound processing apparatus 31. The information output from the playback sound pressure calculation unit 343 is supplied to the sound pressure information display unit 317 of the playback processing unit 301 and used for screen display.

In this way, it is possible for the headphone 32 to calculate the playback sound pressure of the headphone 32.

Fourth Example

Figure 15:
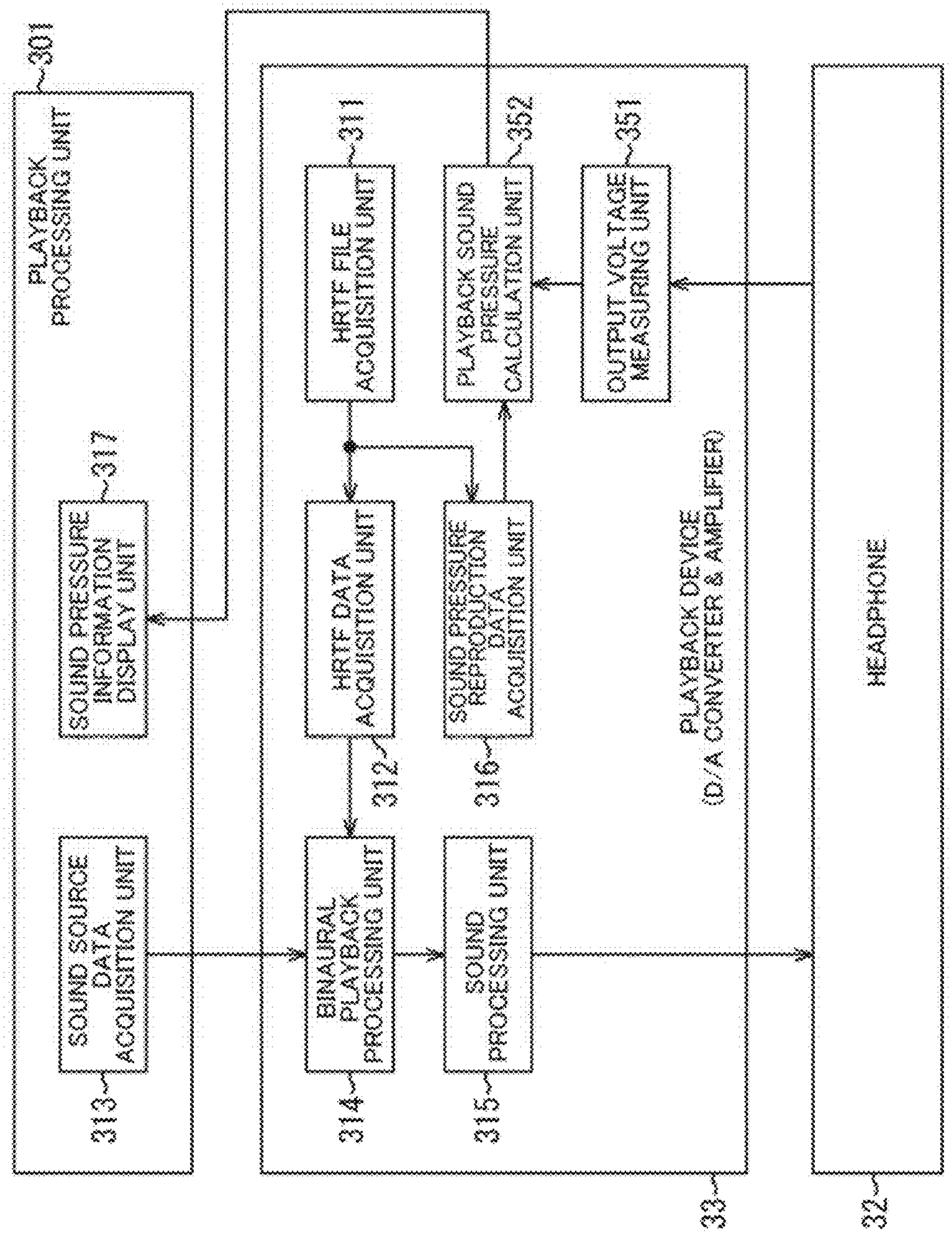
FIG. 15 is a block diagram showing another configuration example related to voltage measurement.

FIG. 15 is a block diagram showing another configuration example related to voltage measurement.

In the configuration shown in FIG. 15, the playback device 33 acquires the HRTF data and the sound pressure reproduction data and measures the voltage applied to the headphone 32. In the example of FIG. 15, the playback device 33 also calculates the playback sound pressure.

The playback device 33 having functions of a D/A converter and an amplifier is connected to the sound processing apparatus 31, and a cable on the headphone 32 side is connected to a headphone terminal provided in the playback device 33. Sound source data output from the sound processing apparatus 31 is supplied to the playback device 33. The playback signal output from the sound processing unit 315 of the playback device 33 is supplied to the headphone 32.

The playback device 33 is provided with an HRTF file acquisition unit 311, an HRTF data acquisition unit 312, a binaural playback processing unit 314, a sound processing unit 315, and a sound pressure reproduction data acquisition unit 316. The HRTF file acquisition unit 311, the HRTF data acquisition unit 312, the binaural playback processing unit 314, the sound processing unit 315, and the sound pressure reproduction data acquisition unit 316 provided in the playback device 33 have the same functions as the HRTF file acquisition unit 311, the HRTF data acquisition unit 312, the binaural playback processing unit 314, the sound processing unit 315, and the sound pressure reproduction data acquisition unit 316 provided in the sound processing apparatus 31, respectively.

The playback device 33 is provided with an output voltage measuring unit 351 and a playback sound pressure calculation unit 352.

The output voltage measuring unit 351 measures the output voltage to the headphone 32 and outputs information representing the measurement result to the playback sound pressure calculation unit 352.

The playback sound pressure calculation unit 352 calculates the playback sound pressure of the headphone 32 based on the specified signal voltage represented by the information supplied from the sound pressure reproduction data acquisition unit 316 and the output voltage measured by the output voltage measuring unit 351, and outputs information representing the calculated playback sound pressure to the sound processing apparatus 31. The information output from the playback sound pressure calculation unit 352 is acquired by the sound pressure information display unit 317 of the playback processing unit 301 and used to display information on the playback sound pressure.

In this way, it is possible for the playback device 33 to perform processing of acquiring HRTF data and sound pressure reproduction data, measuring the voltage applied to the headphone 32, and calculating the playback sound pressure of the headphone 32.

Fifth Example

Figure 16:
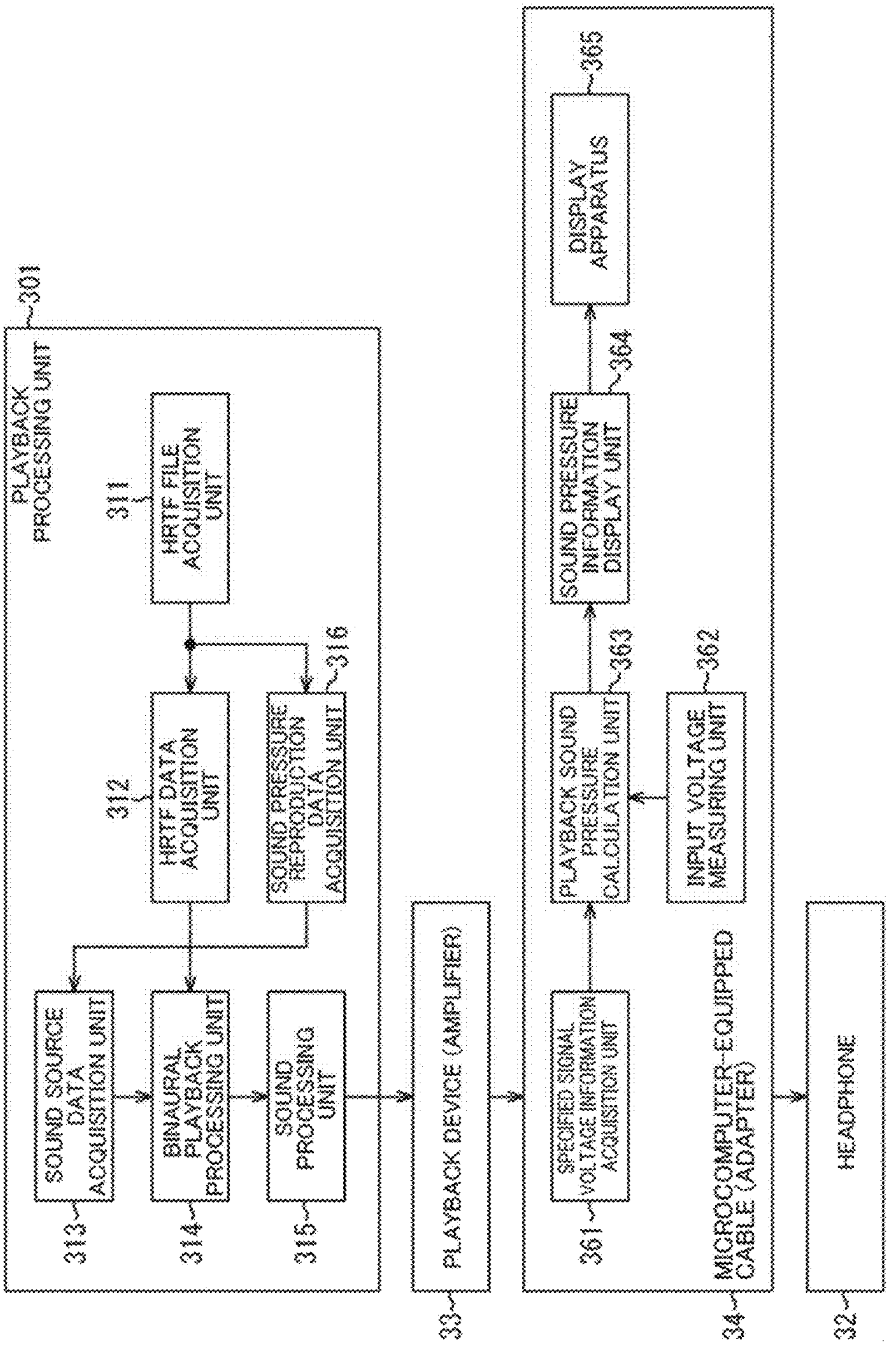
FIG. 16 is a block diagram showing another configuration example related to voltage measurement.

FIG. 16 is a block diagram showing another configuration example related to voltage measurement.

In the configuration shown in FIG. 16, acquisition of the HRTF data and the sound pressure reproduction data is performed on the sound processing apparatus 31 side, and the measurement of the voltage applied to the headphone 32 and the calculation of the playback sound pressure are performed on the side of a microcomputer-equipped cable 34 provided between the playback device 33 and the headphone 32. A playback signal output from the sound processing unit 315 of the sound processing apparatus 31 and subjected to processing such as amplification in the playback device 33 is supplied to the headphone 32 via the microcomputer-equipped cable 34.

In the microcomputer-equipped cable 34, a specified signal voltage information acquisition unit 361, an input voltage measuring unit 362, a playback sound pressure calculation unit 363, and a sound pressure information display unit 364 are implemented by a microcomputer. The microcomputer-equipped cable 34 is configured by providing a unit including a microcomputer or the like at a predetermined position of the cable. A display apparatus 365 configured using a small LCD or the like is provided on the surface of the unit including a microcomputer or the like.

The specified signal voltage information acquisition unit 361, the input voltage measuring unit 362, and the playback sound pressure calculation unit 363 of the microcomputer-equipped cable 34 have the same functions as the specified signal voltage information acquisition unit 341, the input voltage measuring unit 342, and the playback sound pressure calculation unit 343 in FIG. 14, respectively.

That is, the specified signal voltage information acquisition unit 361 acquires information on the specified signal voltage included in the sound pressure reproduction data, and the input voltage measuring unit 362 measures the input voltage to the headphone 32. The playback sound pressure of the headphone 32 is calculated by the playback sound pressure calculation unit 363 based on the specified signal voltage and the input voltage to the headphone 32. The information representing the playback sound pressure calculated by the playback sound pressure calculation unit 363 is supplied to the sound pressure information display unit 364.

The information of the specified signal voltage included in the sound pressure reproduction data may be obtained from the sound processing apparatus 31, or may be obtained from a memory accessible by the microcomputer. The memory stores information on the specified signal voltage included in the sound pressure reproduction data.

The sound pressure information display unit 364 causes the display apparatus 365 to display information related to the playback sound pressure of the headphone 32 calculated by the playback sound pressure calculation unit 363. The producer checks the display on the display apparatus 365 and adjusts the volume of the headphone 32.

In this way, the measurement of the voltage applied to the headphone 32 and the calculation of the playback sound pressure of the headphone 32 can be performed by an apparatus different from the headphone 32 and the playback device 33.

Sixth Example

Figure 17:
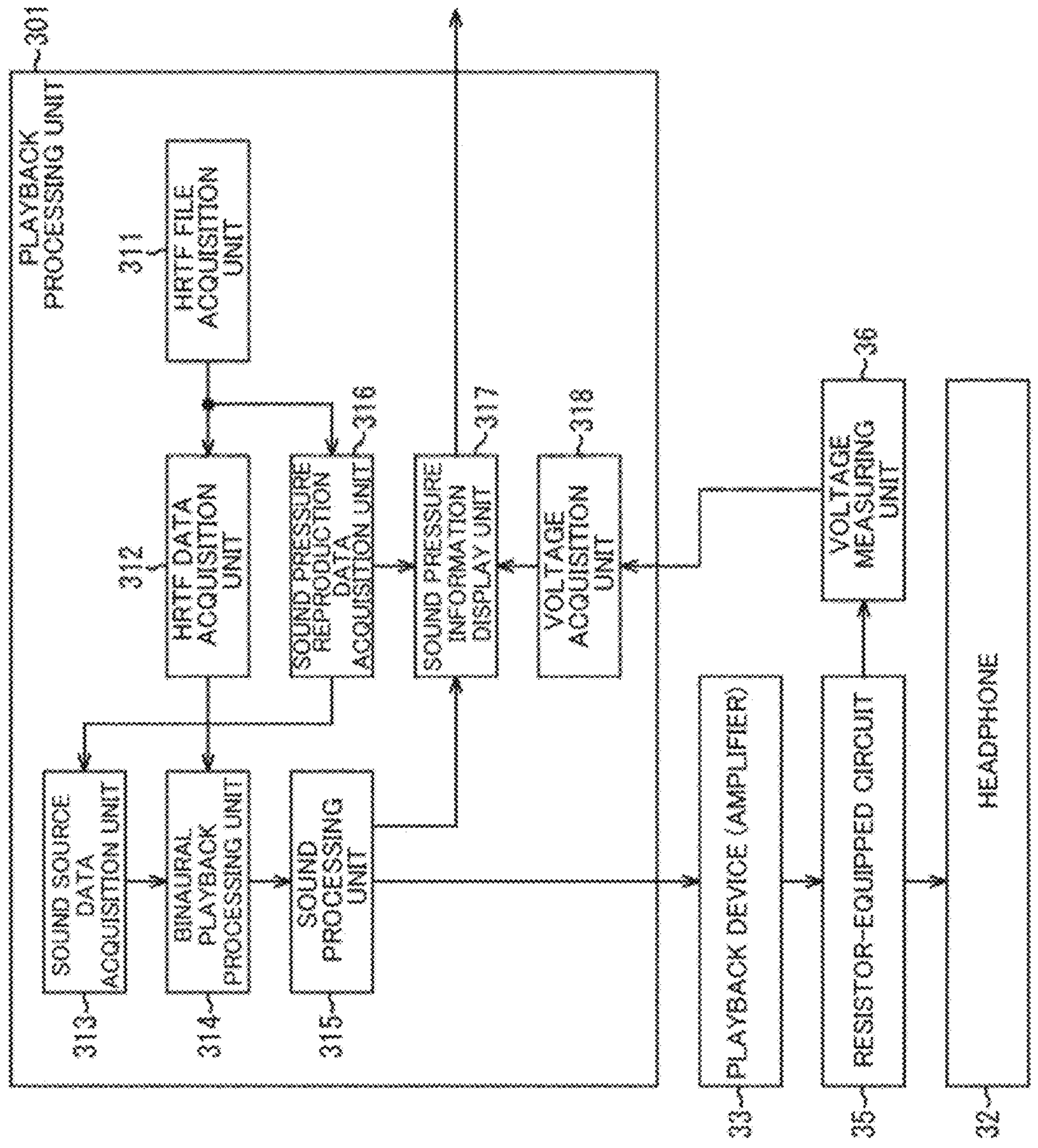
FIG. 17 is a block diagram showing another configuration example related to voltage measurement.

FIG. 17 is a block diagram showing another configuration example related to voltage measurement.

In the configuration shown in FIG. 17, HRTF data and sound pressure reproduction data are acquired on the sound processing apparatus 31 side, and the voltage applied to the headphone 32 is measured by a resistor-equipped circuit 35 provided between the playback device 33 and the headphone 32. For example, a voltage measuring apparatus 36 is connected to the resistor-equipped circuit 35 provided on the jig, and the output voltage of the headphone 32 is measured.

The voltage measuring apparatus 36 measures the input voltage to the headphone 32 and outputs information representing the measurement result to the sound processing apparatus 31. The information output from the input voltage measuring unit 331 is acquired by the voltage acquisition unit 318 of the playback processing unit 301.

Thus, by attaching a jig having a resistance equivalent to that of the headphone 32 between the playback device 33 and the headphone 32, it is possible to measure the voltage taking the voltage division effect into consideration.

Seventh Example

Figure 18:
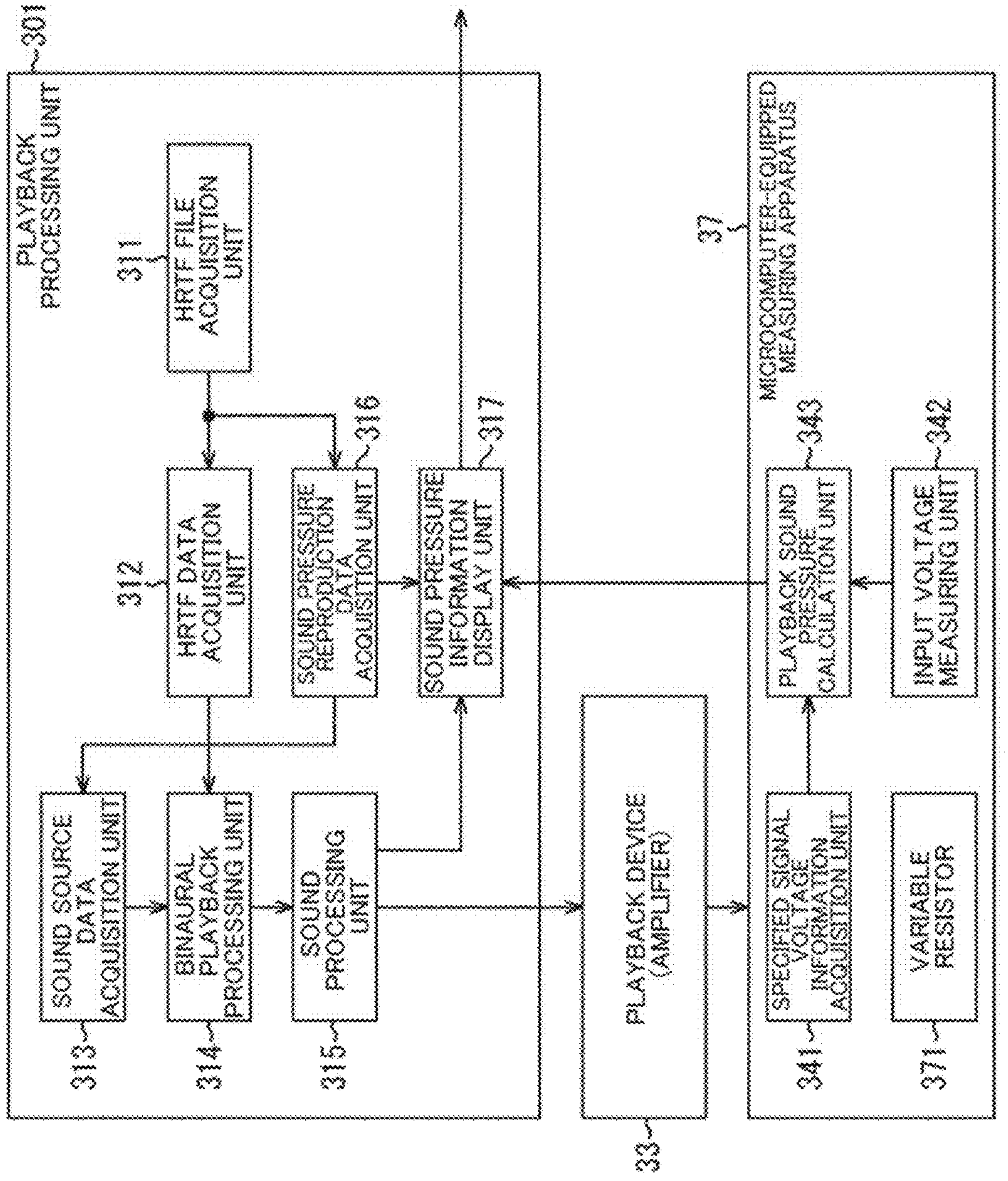
FIG. 18 is a block diagram showing another configuration example related to voltage measurement.

FIG. 18 is a block diagram showing another configuration example related to voltage measurement.

The configuration shown in FIG. 18 is a configuration when the headphone 32 is not used. A microcomputer-equipped measuring apparatus 37 having a variable resistor 371 is connected to the playback device 33. The configuration of the microcomputer-equipped measuring apparatus 37 is the same as the configuration of the headphone 32 described with reference to FIG. 14, except that the variable resistor 371 is provided.

The resistance value of the variable resistor 371 is adjusted to be the same value as the resistance value provided in the headphone 32.

The information on the specified signal voltage included in the sound pressure reproduction data is acquired by the specified signal voltage information acquisition unit 341, and the voltage of the variable resistor 371 simulating the headphone 32 is measured by the input voltage measuring unit 342. The playback sound pressure is calculated by the playback sound pressure calculation unit 343 based on the specified signal voltage and the voltage measured by the input voltage measuring unit 342. The information representing the playback sound pressure calculated by the playback sound pressure calculation unit 343 is supplied to the sound pressure information display unit 317 of the playback processing unit 301 and used for screen display.

Thus, by using the microcomputer-equipped measuring apparatus 37, it is possible to measure the voltage taking the voltage division effect in the headphone 32 into consideration without connecting the headphone 32 to the playback device 33. Moreover, even when the impedance (resistance value) of the headphone 32 is low, it is possible to measure the voltage taking the voltage dividing effect when the cable is inserted into consideration.

In this way, it is possible to measure the voltage applied to the headphone 32 that outputs the playback sound of the specified signal using not only the headphone 32 and the playback device 33 but also various external apparatuses.

Modification Examples

Although an overhead-type headphone is used as the sound output apparatus, an inner ear-type headphone (earphone) may be used. Instead of the headphone, a speaker may be used as the sound output apparatus.

Headphones with the same specifications are used in the measurement environment and the playback environment, but headphones with different specifications may be used. For example, even if a headphone different from the headphone used in the measurement environment (a headphone with a different voltage when set to 0 dB) is used as the headphone 32 in the playback environment, volume adjustment is performed in the above-described manner by referring to the voltage applied to the headphone 32.

The information representing the voltage value actually measured in the measurement environment was recorded as sound pressure reproduction data, but information representing the average voltage value when using headphones with various specifications may be recorded. In this way, it is possible to reproduce the sound pressure with a certain degree of accuracy.

Although the sound production system shown in FIG. 1 is used to produce sound for movies, the sound production system of FIG. 1 can be applied to systems used for producing various sounds such as a system used for producing music and a system used for producing sound for television programs.

The sound pressure may be reproduced as described above when the sound is played by a consumer apparatus instead of when the sound of contents is produced.

Example of Recording Multiple Combinations of Reference Sound Pressure and Applied Voltage in Sound Pressure Reproduction Data When measuring in the measurement environment, the volume of the headphone 22 is adjusted so that the playback sound pressure is the same as the playback sound pressure of the speaker 23 based on the specified sound pressure such as 85 dBC and 78 dBA used for calibration. The volume of the headphone 22 may be adjusted using a sound pressure different from the specified sound pressure as a reference sound pressure. For example, a sound pressure often used during editing, such as −20 dB applied when Dim is set, is set as the reference sound pressure.

Alternatively, the volume of the headphone 22 may be adjusted using a plurality of types of reference sound pressures with different sound pressure levels.

For example, using a certain reference sound pressure as a reference, the volume of the headphone 22 is adjusted so that the playback sound pressure is the same as the playback sound pressure of the speaker 23, and the voltage applied to the headphone 22 after the volume adjustment is measured. After measuring the applied voltage, the reference sound pressure is switched, and volume adjustment of the headphone 22 and measurement of the applied voltage are repeated.

As a result, a plurality of combinations of reference sound pressure and applied voltage are measured. In the sound pressure reproduction data, information representing each combination of the reference sound pressure and the applied voltage is recorded in addition to information representing the combination of the specified sound pressure and the applied voltage measured using the specified sound pressure. That is, in addition to the information representing the specified sound pressure and the information representing the specified signal voltage (FIG. 6), a plurality of combinations of information representing the reference sound pressure and information representing the applied voltage are recorded in the sound pressure reproduction data.

The information representing multiple combinations of reference sound pressure and applied voltage is recorded in the sound pressure reproduction data and provided to the playback environment. Thus, the information can be used for correcting an error occurring when the frequency characteristics of the headphone used in the playback environment change non-linearly with respect to the change in the playback sound pressure during volume adjustment.

When adjusting the volume on the playback environment side, it may not be possible to reproduce the reference sound pressure even if the volume is adjusted, depending on the frequency characteristics of the diaphragm of the headphone used on the playback environment side. The above-mentioned error means the difference between the reference sound pressure to be reproduced in the playback environment and the sound pressure (playback sound pressure) of the sound actually output from the headphone. By correcting the error that occurs when adjusting the volume in the playback environment based on the relationship between the reference sound pressure and the applied voltage, it is possible to output sound with a sound pressure equivalent to the reference sound pressure from the headphone.

Configuration Example of Computer

The above-mentioned series of processes can be executed by hardware or software. When the series of processing steps are executed by software, a program that constitutes the software is installed from a program recording medium on a computer built in dedicated hardware or a general-purpose personal computer. The above-mentioned series of processes can be executed by hardware or software.

Figure 19:
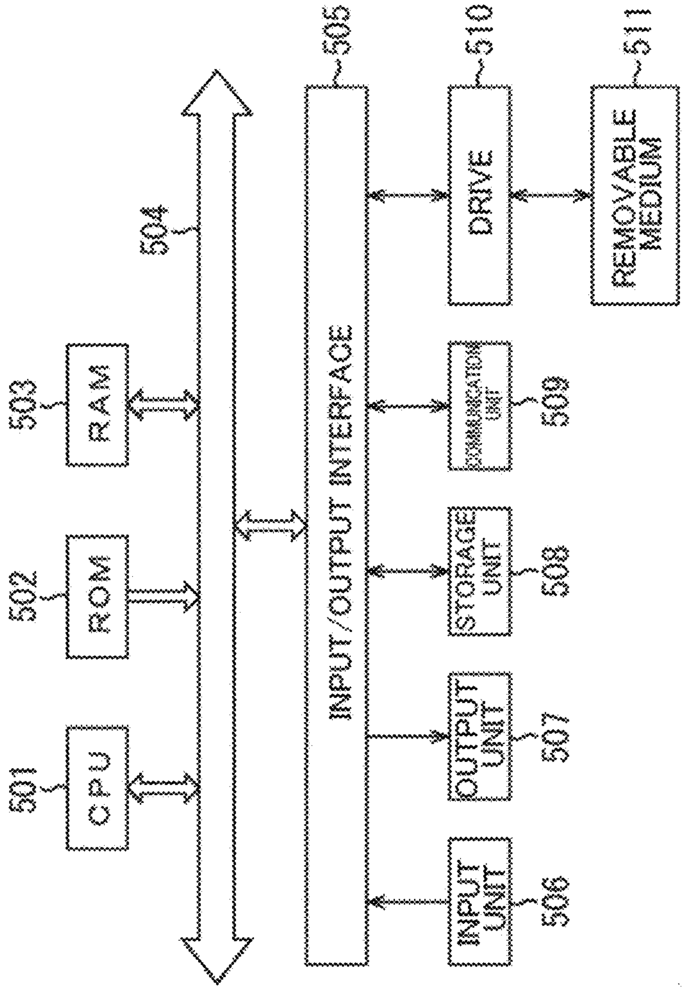
FIG. 19 is a block diagram showing a configuration example of a computer.

FIG. 19 is a block diagram showing a configuration example of computer hardware that executes the above-described series of processing using a program. The information processing apparatus 1 and the sound processing apparatus 31 are configured using a PC having the same configuration as that shown in FIG. 19.

A CPU (Central Processing Unit) 501, a read-only memory (ROM) 502, and a random access memory (RAM) 503 are connected with one another by a bus 504.

An input/output interface 505 is additionally connected to the bus 504. An input unit 506 configured of a keyboard, a mouse, and the like, and an output unit 507 configured of a display, a speaker, and the like are connected to the input/output interface 505. In addition, the storage unit 508 including a hard disk, a non-volatile memory, and the like, the communication unit 509 including a network interface and the like, and a drive 510 that drives a removable medium 511 are connected to the input/output interface 505.

In the computer that has the above configuration, for example, the CPU 501 performs the above-described series of processes by loading a program stored in the storage unit 508 to the RAM 503 via the input/output interface 505 and the bus 504 and executing the program.

The program executed by the CPU 501 is recorded on, for example, the removable medium 511 or is provided via a wired or wireless transfer medium such as a local area network, the Internet, or a digital broadcast to be installed in the storage unit 508.

The program executed by the computer may be a program that performs a plurality of steps of processing in time series in the order described in the present specification or may be a program that performs a plurality of steps of processing in parallel or at a necessary timing such as when a call is made.

Meanwhile, in the present specification, a system is a collection of a plurality of constituent elements (apparatuses, modules (components), or the like) and all the constituent elements may be located or not located in the same casing. Thus, a plurality of apparatuses housed in separate housings and connected via a network, and one apparatus in which a plurality of modules are housed in one housing are both systems.

The effects described in the present specification are merely examples and are not intended as limiting, and other effects may be obtained.

The embodiments of the present technology are not limited to the aforementioned embodiments, and various changes can be made without departing from the gist of the present technology.

For example, the present technique may be configured as cloud computing in which a plurality of apparatuses share and cooperatively processing one function via a network.

In addition, each step described in the above flowchart can be executed by one apparatus or executed in a shared manner by a plurality of apparatuses.

Furthermore, in a case in which one step includes a plurality of processes, the plurality of processes included in the one step can be executed by one apparatus or executed in a shared manner by a plurality of apparatuses.

<Combination Example of Configuration>

The present technology can also have the following configuration.

(1)

An information processing apparatus including: an information processing unit that records sound pressure reproduction data used to reproduce sound pressure of a speaker as a sound pressure when outputting a playback sound obtained by playback processing using transfer characteristics of sound in a measurement environment where the speaker is installed from an output apparatus prepared in a playback environment together with transfer characteristic data representing the transfer characteristics.

(2)

The information processing apparatus according to (1), further including a sound pressure reproduction data generation unit that generates the sound pressure reproduction data including information representing a voltage applied to another output apparatus prepared in the measurement environment, the output apparatus outputting the playback sound obtained by playback processing using the transfer characteristics with the same sound pressure as the sound pressure of the speaker.

(3)

The information processing apparatus according to (2), wherein the sound pressure reproduction data generation unit generates the sound pressure reproduction data based on a measurement result of the voltage applied to the other output apparatus that outputs a playback sound of a specified signal.

(4)

The information processing apparatus according to (3), wherein the sound pressure reproduction data generation unit generates the sound pressure reproduction data based on a measurement result of the applied voltage acquired in a state where a volume of the other output apparatus is adjusted so that a sound pressure of the playback sound of the specified signal is the same as the sound pressure of the speaker.

(5)

The information processing apparatus according to (3) or (4), wherein the sound pressure reproduction data generation unit generates the sound pressure reproduction data further including at least one of information representing a reference sound pressure of the measurement environment, information representing a type of the specified signal, and information related to the other output apparatus prepared in the measurement environment.

(6)

The information processing apparatus according to any one of (2) to (5), further including a transfer characteristic data generation unit that generates the transfer characteristic data based on first transfer characteristics measured based on a playback sound output by the speaker and second transfer characteristics measured based on a playback sound obtained by playback processing using the first transfer characteristics, output by the other output apparatus.

(7)

The information processing apparatus according to (6), wherein the transfer characteristic data generation unit corrects the first transfer characteristics by superimposing inverse characteristics of the second transfer characteristics on the first transfer characteristics to generate the transfer characteristic data.

(8)

An information processing method for allowing an information processing apparatus to record sound pressure reproduction data used to reproduce sound pressure of a speaker as a sound pressure when outputting a playback sound obtained by playback processing using transfer characteristics of sound in a measurement environment where the speaker is installed from an output apparatus prepared in a playback environment together with transfer characteristic data representing the transfer characteristics.

(9)

A program for allowing a computer to execute processing of recording sound pressure reproduction data used to reproduce sound pressure of a speaker as a sound pressure when outputting a playback sound obtained by playback processing using transfer characteristics of sound in a measurement environment where the speaker is installed from an output apparatus prepared in a playback environment together with transfer characteristic data representing the transfer characteristics.

(10)

A sound processing apparatus including a display processing unit that displays information related to a sound pressure of an output apparatus prepared in a playback environment based on sound pressure reproduction data used to reproduce a sound pressure of a speaker as a sound pressure when outputting a playback sound obtained by playback processing using transfer characteristics of sound in a measurement environment where the speaker is installed from the output apparatus, the sound pressure reproduction data being recorded together with the transfer characteristic data representing the transfer characteristics.

(11)

The sound processing apparatus according to (10), wherein the display processing unit displays information related to a sound pressure of the output apparatus based on the sound pressure reproduction data including information representing a voltage applied to another output apparatus prepared in the measurement environment, the output apparatus outputting the playback sound obtained by playback processing using the transfer characteristics with the same sound pressure as the sound pressure of the speaker.

(12)

The sound processing apparatus according to (11), the display processing unit displays information related to the sound pressure of the output apparatus based on the sound pressure reproduction data further including at least one of information representing a reference sound pressure of the measurement environment, information representing a type of the specified signal, and information related to the other output apparatus prepared in the measurement environment.

(13)

The sound processing apparatus according to (12), further including: a binaural processing unit that performs binaural processing based on the transfer characteristic data to play the specified signal; and a voltage acquisition unit that acquires a measurement result of the voltage applied to the output apparatus that outputs a playback sound of the specified signal.

(14)

The sound processing apparatus according to (13), wherein the display processing unit displays the sound pressure of the output apparatus calculated based on a measurement result of the voltage applied to the output apparatus and a voltage applied to the other output apparatus represented by information included in the sound pressure reproduction data.

(15)

The sound processing apparatus according to (13) or (14), wherein the voltage acquisition unit acquires the measurement result of the voltage applied to the output apparatus measured by an external apparatus or the output apparatus.

(16)

A sound processing method for allowing a sound processing apparatus to display information related to a sound pressure of an output apparatus prepared in a playback environment based on sound pressure reproduction data used to reproduce a sound pressure of a speaker as a sound pressure when outputting a playback sound obtained by playback processing using transfer characteristics of sound in a measurement environment where the speaker is installed from the output apparatus, the sound pressure reproduction data being recorded together with the transfer characteristic data representing the transfer characteristics.

(17)

A program for allowing a computer to execute processing of displaying information related to a sound pressure of an output apparatus prepared in a playback environment based on sound pressure reproduction data used to reproduce a sound pressure of a speaker as a sound pressure when outputting a playback sound obtained by playback processing using transfer characteristics of sound in a measurement environment where the speaker is installed from the output apparatus, the sound pressure reproduction data being recorded together with the transfer characteristic data representing the transfer characteristics.

REFERENCE SIGNS LIST

1 Information processing apparatus
21 Microphone
22 Headphone
23 Speaker
31 Sound processing apparatus
32 Headphone
33 Playback device
101 Information processing unit
101, 111 Playback processing unit
112 Output control unit
113 Playback sound pressure acquisition unit
114 HRTF acquisition unit
115 HRTF data generation unit
116 Specified signal voltage acquisition unit
117 Sound pressure reproduction data generation unit
118 HRTF file generation unit
301 Playback processing unit
311 HRTF file acquisition unit
312 HRTF data acquisition unit
313 Sound source data acquisition unit
314 Binaural playback processing unit
315 Sound processing unit
316 Sound pressure reproduction data acquisition unit
317 Sound pressure information display unit
318 Voltage acquisition unit

The invention claimed is:

1. An information processing apparatus comprising:

an information processing unit that in a measurement environment where a speaker is installed when the speaker is outputting a playback sound obtained by playback processing using transfer characteristics of sound records sound pressure reproduction data used to reproduce sound pressure of the speaker as a sound pressure from an output apparatus prepared in a playback environment together with transfer characteristic data representing the transfer characteristics; and a sound pressure reproduction data generation unit that generates the sound pressure reproduction data including information representing a voltage applied to the output apparatus prepared in the measurement environment, the output apparatus outputting the playback sound obtained by playback processing using the transfer characteristics with the same sound pressure as the sound pressure of the speaker.

2. The information processing apparatus according to claim 1, wherein the sound pressure reproduction data generation unit generates the sound pressure reproduction data based on a measurement result of the voltage applied to the other output apparatus that outputs a playback sound of a specified signal.

3. The information processing apparatus according to claim 2, wherein the sound pressure reproduction data generation unit generates the sound pressure reproduction data based on a measurement result of the applied voltage acquired in a state where a volume of the other output apparatus is adjusted so that a sound pressure of the playback sound of the specified signal is the same as the sound pressure of the speaker.

4. The information processing apparatus according to claim 2, wherein the sound pressure reproduction data generation unit generates the sound pressure reproduction data further including at least one of information representing a reference sound pressure of the measurement environment, information representing a type of the specified signal, and information related to the output apparatus prepared in the measurement environment.

5. The information processing apparatus according to claim 1, further comprising a transfer characteristic data generation unit that generates the transfer characteristic data based on first transfer characteristics measured based on a playback sound output by the speaker and second transfer characteristics measured based on a playback sound obtained by playback processing using the first transfer characteristics, output by the output apparatus.

6. The information processing apparatus according to claim 5, wherein the transfer characteristic data generation unit corrects the first transfer characteristics by superimposing inverse characteristics of the second transfer characteristics on the first transfer characteristics to generate the transfer characteristic data.

7. An information processing method for allowing an information processing apparatus in a measurement environment where a speaker is installed when the speaker is outputting a playback sound obtained by playback processing using transfer characteristics of sound to record sound pressure reproduction data used to reproduce sound pressure of a speaker as a sound pressure from an output apparatus prepared in a playback environment together with transfer characteristic data representing the transfer characteristics, and to generate sound pressure reproduction data including information representing a voltage applied to the output apparatus prepared in the measurement environment, the output apparatus outputting the playback sound obtained by playback processing using the transfer characteristics with the same sound pressure as the sound pressure of the speaker.

8. A non-transitory computer readable medium storing instructions that, when executed by a computer, cause the computer to execute processing in a measurement environment where a speaker is installed when the speaker is outputting a playback sound obtained by playback processing using transfer characteristics of sound of recording sound pressure reproduction data used to reproduce sound pressure of a speaker as a sound pressure from an output apparatus prepared in a playback environment together with transfer characteristic data representing the transfer characteristics, and of generating sound pressure reproduction data including information representing a voltage applied to the output apparatus prepared in the measurement environment, the output apparatus outputting the playback sound obtained by playback processing using the transfer characteristics with the same sound pressure as the sound pressure of the speaker.

* * * * *